US012234125B2

(12) United States Patent
Schwaigerlehner et al.

(10) Patent No.: US 12,234,125 B2
(45) Date of Patent: Feb. 25, 2025

(54) TRIGGERING UNIT FOR ACTUATING AN ELEVATOR BRAKING DEVICE

(71) Applicant: Wittur Holding GmbH, Wiedenzhausen (DE)

(72) Inventors: Lukas Schwaigerlehner, Scheibbs (AT); Christoph Russwurm, Ober-Grafendorf (AT); René Holzer, Scheibbs (AT); Leopold Latschbacher, Neustadtl a.d. Donau (AT); Karl Kriener, Viehdorf (AT)

(73) Assignee: Wittur Holding GmbH, Wiedenzhausen (DE)

( * ) Notice: Subject to any disclaimer, the term of this patent is extended or adjusted under 35 U.S.C. 154(b) by 267 days.

(21) Appl. No.: 17/799,631

(22) PCT Filed: Feb. 12, 2021

(86) PCT No.: PCT/EP2021/053478

§ 371 (c)(1),
(2) Date: Aug. 12, 2022

(87) PCT Pub. No.: WO2021/160815

PCT Pub. Date: Aug. 19, 2021

(65) Prior Publication Data

US 2023/0076606 A1 Mar. 9, 2023

(30) Foreign Application Priority Data

Feb. 14, 2020 (DE) ......................... 202020100804.8

(51) Int. Cl.
*B66B 5/22* (2006.01)
*B66B 5/04* (2006.01)

(52) U.S. Cl.
CPC ................ *B66B 5/22* (2013.01); *B66B 5/044* (2013.01)

(58) Field of Classification Search
CPC .... B66B 5/20; B66B 5/18; B66B 5/22; B66B 5/044; B66B 5/16; B66B 5/046
See application file for complete search history.

(56) References Cited

U.S. PATENT DOCUMENTS 4,512,444 A * 4/1985 Koppensteiner .......... B66B 5/28
188/41
5,791,442 A * 8/1998 Arnold .................... F16D 65/22
188/164

(Continued)

FOREIGN PATENT DOCUMENTS

DE 1406200 A1 10/1968
DE 102013111385 A1 * 4/2015 ............... B66B 5/18

(Continued)

OTHER PUBLICATIONS

International Search Report and Written Opinion for PCT Application No. PCT/EP2021/053478, filed Feb. 12, 2021; mailed May 14, 2021; 9 pages.

*Primary Examiner* — Michael R Mansen
*Assistant Examiner* — Michelle M Mudwilder

(57) ABSTRACT

A triggering unit for actuating an elevator braking device, having a triggering base body, a trigger, a contact device and a coupling link. The contact device comprises a swivel lever and at least two contact elements, the swivel lever being pivotably anchored on one side of the guide rail and bearing a first contact element in the region between its anchoring and the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body such that it executes a movement which (Continued)

Figure 1:
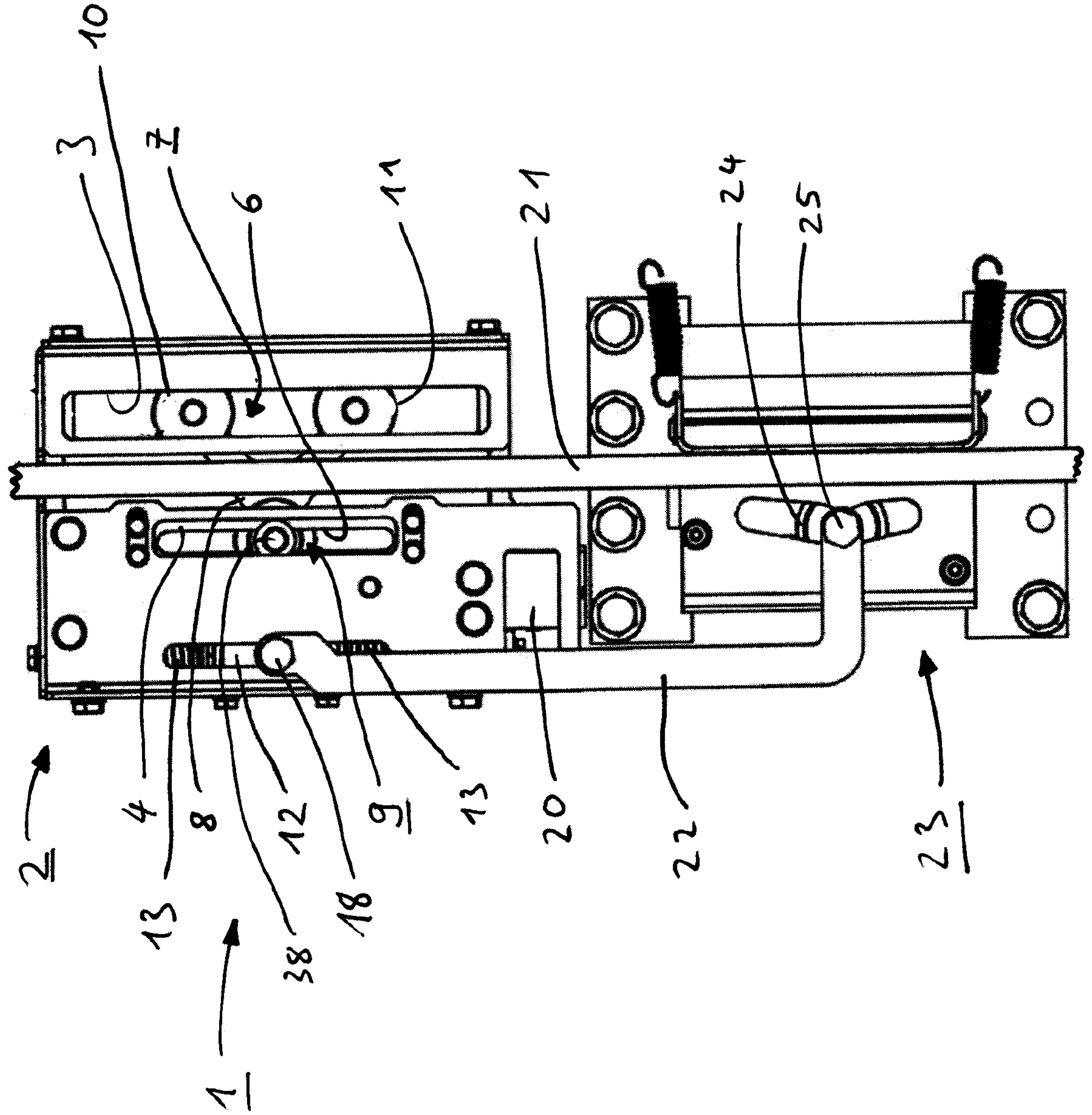

generates tension or pressure at the coupling link, so that the coupling link actuates the elevator braking device.

24 Claims, 31 Drawing Sheets

(56) References Cited

U.S. PATENT DOCUMENTS

| | | | | |
|---|---|---|---|---|
| 6,296,080 | B1 * | 10/2001 | Draper | B66B 5/04 187/373 |
| 2012/0152663 | A1 * | 6/2012 | Legeret | B66B 5/04 187/404 |
| 2019/0062113 | A1 * | 2/2019 | Hu | B66B 9/00 |
| 2020/0207581 | A1 * | 7/2020 | Sotoca | B66B 7/046 |

FOREIGN PATENT DOCUMENTS

| | | | | | |
|---|---|---|---|---|---|
| DE | 202019105584 | U1 | | 10/2019 | |
| EP | 1902993 | B1 | | 3/2008 | |
| EP | 2837592 | A1 | * | 2/2015 | B66B 5/18 |
| FR | 379688 | A | * | 12/2015 | |
| FR | 3022230 | A1 | * | 12/2015 | B66B 5/044 |
| GB | 1021552 | A | * | 3/1966 | |
| WO | 2006077243 | A1 | | 7/2006 | |
| WO | WO-2012128758 | A1 | * | 9/2012 | B66B 1/365 |

* cited by examiner

TRIGGERING UNIT FOR ACTUATING AN ELEVATOR BRAKING DEVICE

The invention relates to a triggering unit for actuating an elevator braking device.

TECHNICAL BACKGROUND

The elevator braking device can be triggered in various ways.

In the case of purely mechanical triggering units, actuation of the braking device is often triggered by an overspeed governor mounted in the shaft. In such triggering units, a self-contained governor rope is usually fitted in the elevator shaft, which is deflected by the overspeed governor and a tensioning roller. The governor rope is connected at one point to the braking device of the elevator car or to the braking element of the braking device and is accordingly carried along by the elevator car when it moves. An impermissibly high car speed then causes the overspeed governor to brake the governor rope. Since the governor rope thus moves more slowly in the elevator shaft than the car and the braking element attached to it, the governor rope exerts a pulling force on the braking element. This causes the braking device or brake to be “pulled” and thus activated.

However, such purely triggering units have various disadvantages, such as their susceptibility to malfunction if the overspeed governor becomes dirty or the relatively high cost of installation. In addition, they require space in the elevator shaft that could actually be better used elsewhere.

STATE OF THE ART

In modern elevators, the shaft is usually equipped with sensors arranged at regular intervals or even complete shafts through electrical positioning systems. In this way, any overspeed can be reliably detected. In the event of overspeed, a signal is then sent to an electromagnetically based triggering unit.

A typical elevator braking device equipped with such an electromagnetic triggering unit is described, for example, in WO2006/077243A1. This shows a braking device for an elevator car, the braking element of which is held in an inactive position by a retaining element as long as the elevator car is not to be braked. The restraining element is an electromagnet which attracts the braking element in the form of a brake roller and thus prevents it from making contact with the guide rail of the elevator. As soon as an impermissibly high speed is measured or the elevator is to be braked for other reasons, the electromagnet is switched off and the braking element is pressed toward the guide rail by a compression spring. There, the brake roller rolls along the guide rail and runs into a wedge-shaped gap between the guide rail and a pressure element, which is also part of the braking device. The brake roller, which is equipped with a friction surface, brakes the car in the process. To bring the braking element back from its braking position to the inactive position, the electromagnet is activated. In this way, the braking element is moved against the action of the compression spring back into a position in which there is no longer any contact with the guide rail. Before the electromagnet is able to attract the braking element, however, it must be pushed out of the wedge gap. To do this, the car is usually moved back a little. However, this braking device requires a relatively strong electromagnet, as there is a relatively large air gap between the magnet and the braking element due to the swivel kinematics.

The electronically actuated trigger proposed by the aforementioned patent specification is specially tailored to this elevator braking device and can therefore only be used in conjunction with it. It does not offer the possibility of retrofitting a large number of other proven elevator braking devices.

A similar elevator braking device with electromagnetic triggering unit is known from European patent specification EP1902993B1. However, the braking element is not directly actuated by the triggering unit, which also consists of an electromagnet and a compression spring. Instead, the electromagnet and the compression spring act on a guiding element that guides the braking element. Since the air gap between the guiding element and the electromagnet is smaller than in the braking device from WO2006/077243A1, a significantly less powerful electromagnet can be used.

Here, too, however, the problem arises that this is also a trigger specially tailored to this type of braking device. It, too, is not suitable as a retrofit solution.

Therefore, the unsatisfactory result remains that the previously known combinations of elevator braking devices and triggering unit are usually completely new assemblies that have to be elaborately developed and certified for each load and speed range.

THE PROBLEM UNDERLYING THE INVENTION

In view of this, the primary task of the invention is to specify a triggering unit by means of which elevator braking devices that previously had to be actuated or triggered mechanically with an overspeed governor cable can be triggered electrically. Preferably, an increased actuating and triggering force is to be applied in order to be able to electronically actuate elevator brakes which have so far been dependent on the high actuating and triggering forces which the overspeed governor cable, which remains behind the car when it is triggered, is capable of applying.

THE INVENTIVE SOLUTION

Accordingly, a triggering unit for actuating an elevator braking device is provided with a triggering base body mountable on the elevator car, a trigger, a contact device and a coupling link.

The elevator braking device can be connected to the triggering unit via the coupling link. The triggering unit is preferably designed as a completely separate assembly from said elevator braking device. It is then connected to the elevator braking device exclusively via the coupling link when mounted as intended. There is preferably no further physical contact. At most, there is direct contact between the walls of the housings which are installed directly adjacent to one another and are usually independent of one another.

The triggering unit is characterized by the fact that the contact device comprises a swivel lever and at least two contact elements. The contact device is used to apply or generate the necessary triggering or actuating forces after being triggered by friction on the guide rail. The swivel lever is pivotably anchored on one side of the guide rail or on one side of the large surface of a guide rail.

When the triggering unit is installed as intended, the swivel lever carries a first contact element in the area between its anchorage and the guide rail.

The first contact element forms a first contact area for contacting the guide rail. Before triggering, the first contact element is spaced from the guide rail. When triggered, it contacts the guide rail.

The swivel lever extends past the guide rail to the other side of the rail or the side of the other large surface of the guide rail. There, the swivel lever carries at least one further, second contact element. The second contact element forms a second contact area for contacting the guide rail.

The first and second contact elements are arranged on the swivel lever in such a way that the swivel lever automatically pulls against the guide rail under the influence of the forces occurring between the contact elements and the guide rail in the triggered state.

The swivel lever is anchored to the triggering base body in such a way that it is braked as it pulls itself against the guide rail and can remain behind the triggering base body by a certain amount. As a result, it performs a movement that generates tension or compression on the coupling link. Consequently, the coupling link actuates the elevator braking device, easily applying the necessary increased triggering or actuating forces.

The special feature of the invention is that the principle of self-reinforcement by friction-induced self-retraction of a wedge is not used for "pulling against the guide rail". Instead, use is made of the principle of self-reinforcement by a torque generated by the frictional forces occurring on the guide rail.

"Self-acted pulling against the guide rail" is understood to mean a self-reinforcing effect, at least to a certain extent. This is caused by the frictional forces between one or more contact elements. The design is such that the frictional force leads to an even bigger contact pressure on the braking contact element(s).

The decisive advantage of self-reinforcement by a friction-induced torque is that the whole thing can be triggered again much more easily than with previous self-reinforcement wedge solutions by initiating a rotary movement in the opposite direction. This is because loosening these usually requires higher triggering forces, which can only be applied with some effort.

In contrast to the braking element of the elevator braking device, the contact device, which consists of a swivel lever and contact elements, does not itself brake the elevator car. The contact device merely provides the servo effect in terms of force which is required to set the elevator braking device in motion. This function of generating braking forces which reduce the speed of the elevator car is rather reserved for the elevator braking device actuated by it with its at least one brake wedge.

For this reason, the triggering unit is also designed in such a way that the self-locking forces between the contact elements and the guide rail are not so high as to cause damage to the guide rail. As soon as the braking element of the elevator braking device has been brought into the braking position via the coupling link, the self-locking between the contact elements and the guide rail is preferably removed.

The fact that the elevator braking device and the triggering unit are only connected via the coupling link and otherwise represent two locally separate assemblies means that they can be mounted on the elevator car frame in a space-saving and flexible manner. In addition, a wide variety of elevator braking devices can be retrofitted. Since the respective coupling link represents the only interface, only adapted coupling links have to be provided.

The term "activating the trigger" or "actuating the trigger" may describe placing the trigger in a state in which it actively causes the first contact element to move toward the guide rail. Preferably, however, the trigger is designed to prevent movement of the first contact element towards the guide rail when in the "non-activated" state, and to allow movement by "activating" it. If the trigger is an electromagnet, it ideally holds back the first contact element in the energized state. "Activation" or "Actuation" then leads to the electromagnet being switched off, which in turn allows the first contact element to move towards the guide rail.

Both a direct action of the trigger on the first contact element and an indirect action via other components are conceivable.

It is also conceivable to use an electric, pneumatic or hydraulic linear actuator as the trigger. In addition, the trigger can also consist of two units, one of which causes the first contact element to be held back and the second of which causes an active, driven movement of the first contact element towards the guide rail.

The term "guide rail" preferably refers to the guide rail of the elevator car running in the elevator shaft. However, this term also covers an additional rail mounted in the elevator shaft, which could be called a "brake rail".

The term "untriggered state" refers to the position of the trigger in which contact between the first contact element and the guide rail is not possible.

The term "triggered state" refers to the position of the trigger in which it allows the first contactor to move towards the guide rail.

The term "braking position" refers to the position of the braking element from which it is automatically driven deeper and deeper into the wedge gap between the elevator braking device and the guide rail by the movement of the elevator car, usually until the car comes to a standstill.

PREFERRED DESIGN OPTIONS

There is a number of ways in which the invention can be designed to further improve its effectiveness or usefulness.

It is particularly preferred that the swivel lever has a third contact element on the said other side of the guide rail. The second and third contact elements are arranged on the swivel lever relative to the first contact element in such a way that the swivel lever tightens in the case of triggering during upward travel and in the case of triggering during downward travel. In the case of triggering during downward travel, the tightening is performed by the interaction of the first and second contact elements. In the case of a downward trip, the tightening is performed by the interaction of the first and third contact elements.

The interaction between the first and third contact elements takes place in the same way as the interaction between the first and second contact elements. The only difference is that one of the two is brought into contact with the guide rail during an upward movement of the elevator car and the other during a downward movement.

The triggering unit therefore acts bidirectionally. It can therefore trigger the braking device both when the car is moving downwards and when it is moving upwards.

The second and third contact elements are generally completely separate and spaced components mounted on the swivel lever. Theoretically, however, it is also conceivable to connect the second and third contact elements directly and integrally with each other by means of a bridge-like connection.

The term "tightening" describes the state in which the first and a further contact element are pulled or pressed towards the guide rail in a self-reinforcing manner.

A further, particularly preferred embodiment is that one or each pair of jointly interacting contact elements are arranged on one and the other side of the guide rail on the swivel lever in such a way that their contact areas interacting in pairs are not completely opposite each other in the direction orthogonal to the direction of travel of the car. Instead, they are arranged offset from each other, at any rate after the trigger.

The term "not completely opposite" describes the fact that the first and the second, or the first and the third contact elements are not at the same height measured in the direction of the guide rail when they are in the triggered state, i.e. when they are in contact with the guide rail.

The tendency of the swivel lever to swivel in the direction opposite to the direction of travel of the car under the influence of the forces between the contact elements and the guide rail is thus increased when one contact element rests against the rail on one side and another contact element rests against the rail on the other side. This results in a particularly favorable servo effect.

Ideally, the first contact element is a freely rotating body of revolution.

By designing the first contact element as a body of revolution, gentle engagement is ensured. Otherwise, there would be a risk of abrupt wedging of the contact device with the guide rail and associated possible damage to the guide rail or the first contact element.

The term "body of revolution" can describe both a roller or a roller and a sphere. However, the design as a roller is clearly preferred.

In a further preferred embodiment, the swivel lever is connected to the coupling link at its pivotably anchored end. Preferably, the connection is made via a common swivel pin. In this case, the slide carries a swivel pin to which the swivel lever is pivotably anchored at its one end. Preferably, the coupling link is also anchored to the slide.

As a result, the coupling link follows any upward or downward movement of the anchored end of the swivel lever relative to the elevator car, bringing the braking element of the elevator breaking device—which is connected to the other end of the coupling link—into its braking position.

By connecting the coupling link to the swivel lever via a swivel pin, potential deflection or tilting of the coupling link is prevented, thus ensuring particularly advantageous kinematic conditions.

The term "swivel pin" describes a connecting element which, in conjunction with two axial securing devices, prevents all relative movements except for a rotational movement of the components connected by the swivel pin.

In a further preferred embodiment, the triggering unit has a transversal slide. The transversal slide can preferably move along a guide of the triggering unit against the action of at least one spring, but preferably two springs acting in opposite directions, or alternatively against the action of pure gravity.

If two opposing contact elements carried by the swivel lever are in engagement with the guide rail, no further swivel movement of the swivel lever can take place. Instead, the entire contact device, i.e. the swivel lever together with the contact elements, performs a translatory movement relative to the car along the guide rail. This moves the coupling link connected to the swivel lever, and the braking element of the braking device is brought safely into the braking position, from which it normally tightens on its own.

If the swivel lever together with the coupling link is now anchored to a transversal slide, which can only be moved from its initial position against the action of a spring, it, and thus also the coupling link and the swivel lever, will be pushed back into its initial position by the spring action if there is no sufficiently large force in the opposite direction to the spring force.

Required for that action is only the condition that the elevator car is at a standstill and the trigger of the triggering unit brings the first contact element back into a position in which it is no longer in contact with the guide rail.

If the transversal slide together with the swivel lever and the coupling link is now pushed into its initial position by the spring action, the braking element is moved out of the braking position and the car can continue to move.

Ideally, the swivel lever has a guide, preferably in the form of an oblong hole, on which the first contact element is mounted in such a way that it can be displaced relative to the swivel lever in the direction of the guide rail when triggered.

In the untriggered state, the first contact element is located with its longitudinal axis at the end of the oblong hole facing away from the guide rail. If the trigger is now activated, the first contact element is displaced in the direction of the guide rail so that it is located with its longitudinal axis on the side of the oblong hole facing the guide rail.

As already described, a further movement of the car causes the swivel lever to swivel when the first contact element is in contact with the guide rail. This results in a self-locking effect.

In another preferred embodiment, the first contact element is mounted in a slotted link (in German: "Kulisse") that can be moved toward and away from the guide rail. The slotted link is designed and operable to hold the first contact element in a standby position on the swivel lever until it is triggered. In the standby position, the first contact element is at a distance from the guide rail. In the course of triggering, the slotted link displaces the first contact element relative to the swivel lever in such a way that the first contact element is pressed against the guide rail.

As already described above, it is conceivable that the trigger of the triggering unit does not act directly on the first contact element, but indirectly on it via one or more further elements.

This allows the trigger to be installed in a position away from the first contact element. The guiding slotted link is thus moved from an initial position to a triggered position with the help of the trigger and brings the first contact element into contact with the guide rail.

The actuation of the slotted link by the trigger can also be done either directly or indirectly via another element.

In another preferred embodiment, the slotted link has a running surface preferably arranged at least substantially parallel to the guide rail. The running surface is arranged and designed in such a way that the first contact element, when it has come into contact with the guide rail, rolls between the guide rail and the running surface, moves in translation and thus swivels the swivel lever. Ideally, the first contact element is a roller and the slotted link has at least one oblong hole. The oblong hole guides an axle section of the roller, with the longitudinal axis of the oblong hole preferably running essentially parallel to the guide rail, and with the oblong hole ideally being at least 10 times longer than it is wide.

The longitudinal axis of an oblong hole is its axis along its maximum extension.

A further preferred embodiment provides that the slotted link of the triggering base body is held at a distance from the guide rail against the action of at least one spring via a trigger lever. The trigger lever is preferably designed in the manner of a two-armed rocker with a rocker bearing arranged between the opposite rocker arms. The trigger lever ideally has an offset which enables its ends, which generally run parallel, to act in different planes.

This design has the advantage that a pressure magnet can be used, there is no need for an elaborate tension-proof connection between the plunger of the magnet and the trigger lever, moreover, the displacement-force transmission ratio between the magnet and the spring-loaded slotted link can be adjusted constructively by appropriate selection of the lever arm length.

Another important advantage is that the comparatively large magnet can be mounted laterally next to the slotted link and/or the transversal slide.

In a further preferred embodiment, the end of the trigger lever facing the slotted link has an actuating lug, one large surface of which faces the guide rail completely and the other large surface of which faces away from the guide rail completely. The actuating lug preferably has an oblong hole or an oversize hole in which a tension bolt is anchored with play, via which the trigger lever can pull the slotted link into its standby position away from the rail. In this way, a particularly compact actuation for the slotted link can be realized. Only a slim arm of the trigger lever has to be positioned between the transversal slide and the slotted link, so the space required here is correspondingly small.

Ideally, the end of the trigger lever facing away from the slotted link guidance has a further actuating lug, one large surface of which faces the guide rail completely and rests against a plunger of the trigger. In this way, a large actuating surface can be conveniently provided, which can be easily and slip-proofly touched by the plunger of a trigger.

Particularly preferably, a resetting element is installed between the swivel lever and the transversal slide, which tends to force the swivel lever back into its neutral or center position, in which the contact element or elements carried by the swivel lever on its side of the guide rail facing away from its anchorage do not come into contact with the guide rail. The resetting element is preferably designed in such a way that it allows the swivel lever to be swiveled clockwise and counterclockwise. Such a resetting element makes it easier to prepare the triggering unit, even while the braking or catching just triggered by it is still running, for the next use after restarting.

It is particularly advantageous if the resetting element comprises a single- or multi-part spring element arranged with its longitudinal axis essentially parallel to the guide rail. Such a spring element can be contacted from both sides and can therefore have a resetting effect both clockwise and counterclockwise.

It is particularly advantageous if the spring element is supported between the swivel lever on the one hand and the slide on the other, as it can then be designed to "travel with" the two aforementioned components that move together.

Ideally, the spring element is mounted on the swivel lever in such a way that it translates as a whole together with the swivel lever when it performs a translational movement.

It has proved particularly clever to realize the resetting element by means of a spring element which, together with a thrust piece projecting radially beyond the spring element at its beginning and another such thrust piece at its end, is held threaded onto a spring guide pin on the swivel arm, a preferably fork-like left-hand and right-hand stop being provided on the transversal slide, so that when the swivel arm is pivoted clockwise, the spring element remains suspended with its thrust piece on the left-hand stop and is then compressed between the latter and the swivel arm, and when the swivel arm is pivoted counterclockwise, the spring element remains suspended with its other thrust piece on the right-hand stop and is then compressed between the latter and the swivel lever.

In a further preferred embodiment, at least the first contact element has a coating made of a plastic. The plastic preferably has a Shore A hardness of 55 to 80 and ideally consists of polyurethane. This provides a particularly good "grip" that does not stress the guide rails.

Alternatively, in some cases it may be preferable to use at least one contact element made of steel. Ideally, it then has a running surface with knurling to ensure the necessary "grip" in this way.

A particularly mild and yet low-wear variant for the guide rails provides one or more contact elements in the form of steel rollers with rubber tires to increase grip, ideally in the form of two soft elastomer cord seals partially embedded in grooves in the steel roller on the left and right sides.

In a further preferred embodiment, a stop is provided which is adjustable, preferably by loosening and tightening, and ideally adjustable in its position in the direction parallel to the guide rail. The contact device comes to rest against the stop, preferably with one of its contact elements. As a rule, the stop takes place as soon as the relative movement between the swivel lever and the triggering base body has progressed to such an extent that the coupling link has irreversibly triggered the elevator braking device even before the car has come to a standstill. When the contact device comes into contact with the stop, the clamping or self-locking between the swivel lever and the guide rail is triggered again—usually by the fact that, as a result of its contact against the stop, the swivel lever can now be pivoted in the opposite direction by the coupling link, which moves relative to the triggering unit together with the braking element, which is retracted even deeper. In this way, resetting can be achieved easily and quickly.

Ideally, the coupling link can be swiveled to the elevator braking device and preferably to its braking element. This facilitates adaptation to the kinematics that the braking device, which may not be inherently designed for such actuation, imposes on its braking element.

Independent protection is also claimed for an elevator braking system consisting of an elevator braking device and a triggering unit. The triggering unit triggers the elevator braking device via a coupling link when required. The elevator braking system is characterized in that it is configured according to one or more of the claims. In this regard, it is not mandatory that the triggering unit be a retrofit solution. Instead, protection for integrated systems of this type comprising an elevator brake and a corresponding triggering unit is also desired hereby.

Protection is also claimed for an elevator having a car and an elevator braking system as previously defined.

LIST OF FIGURES

FIG. 1 Triggering unit in the untriggered state (normal operation) together with the elevator braking device.

Figure 2:
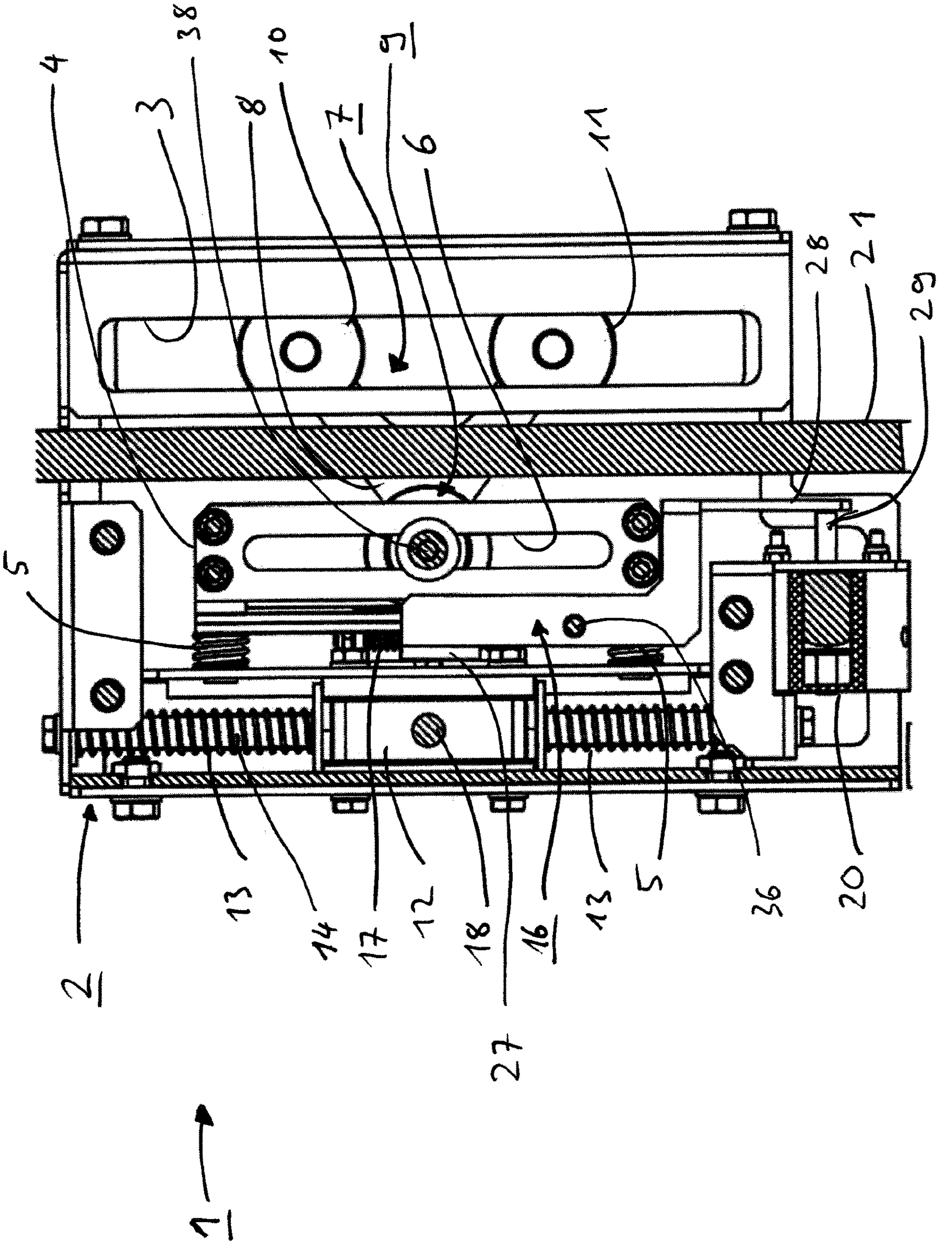

FIG. 2 Front sectional view of the triggering unit in the untriggered state.

Figure 3:
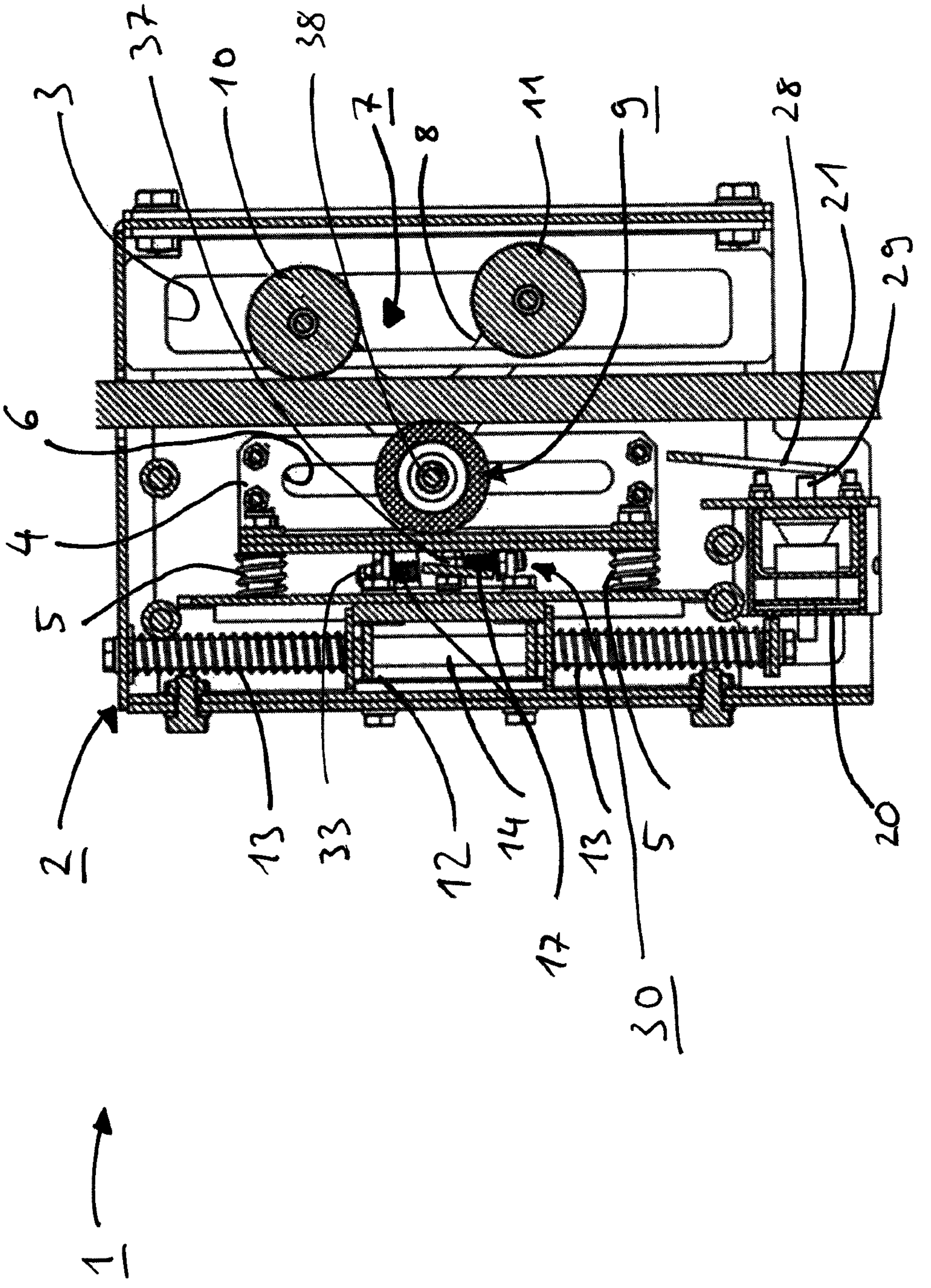
Figure 5:
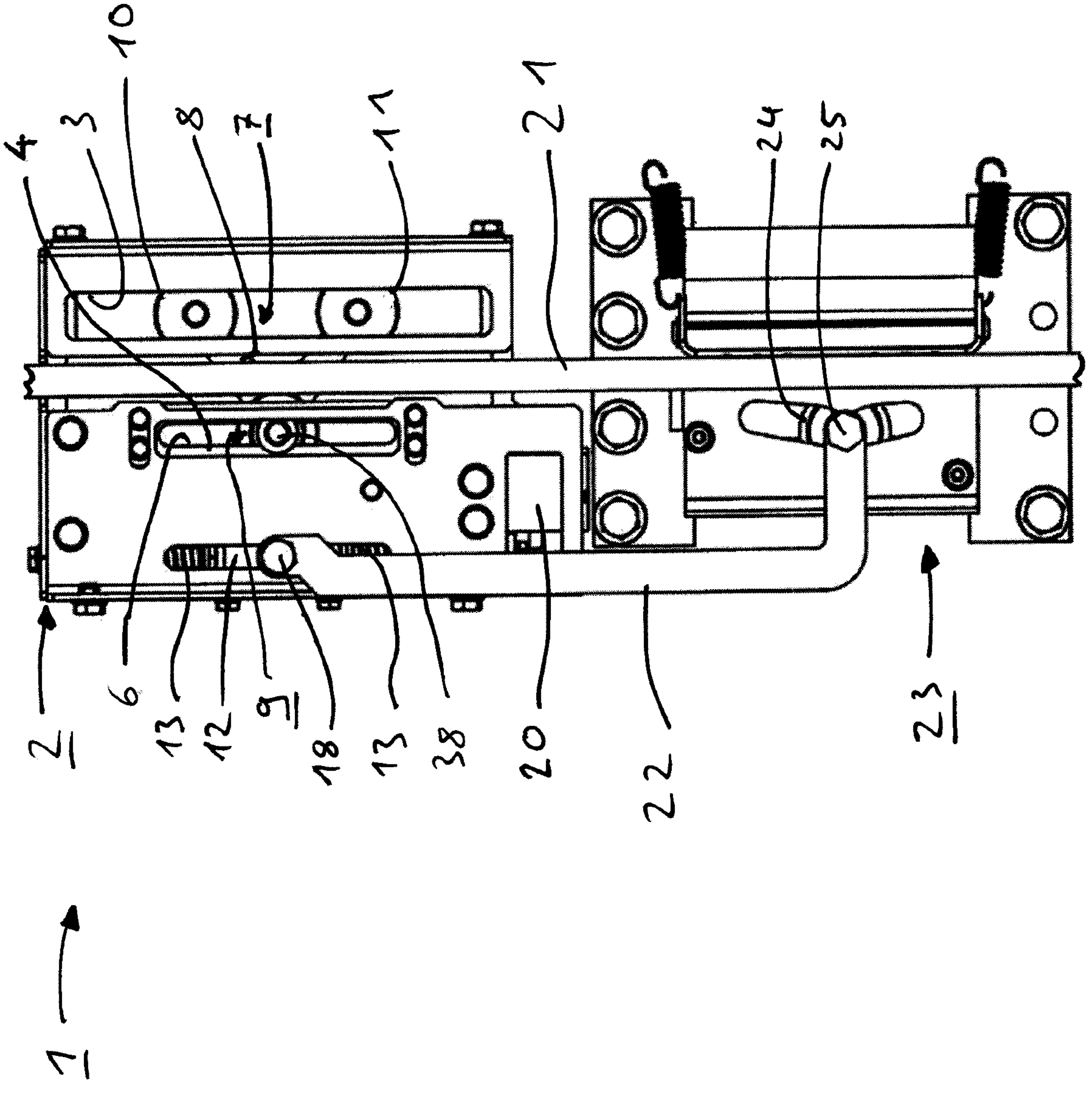

FIG. 3 Sectional view of the triggering unit of the position shown in FIG. 5 with the sectional plane shifted into the plane compared to the other front sectional views.

Figure 4:
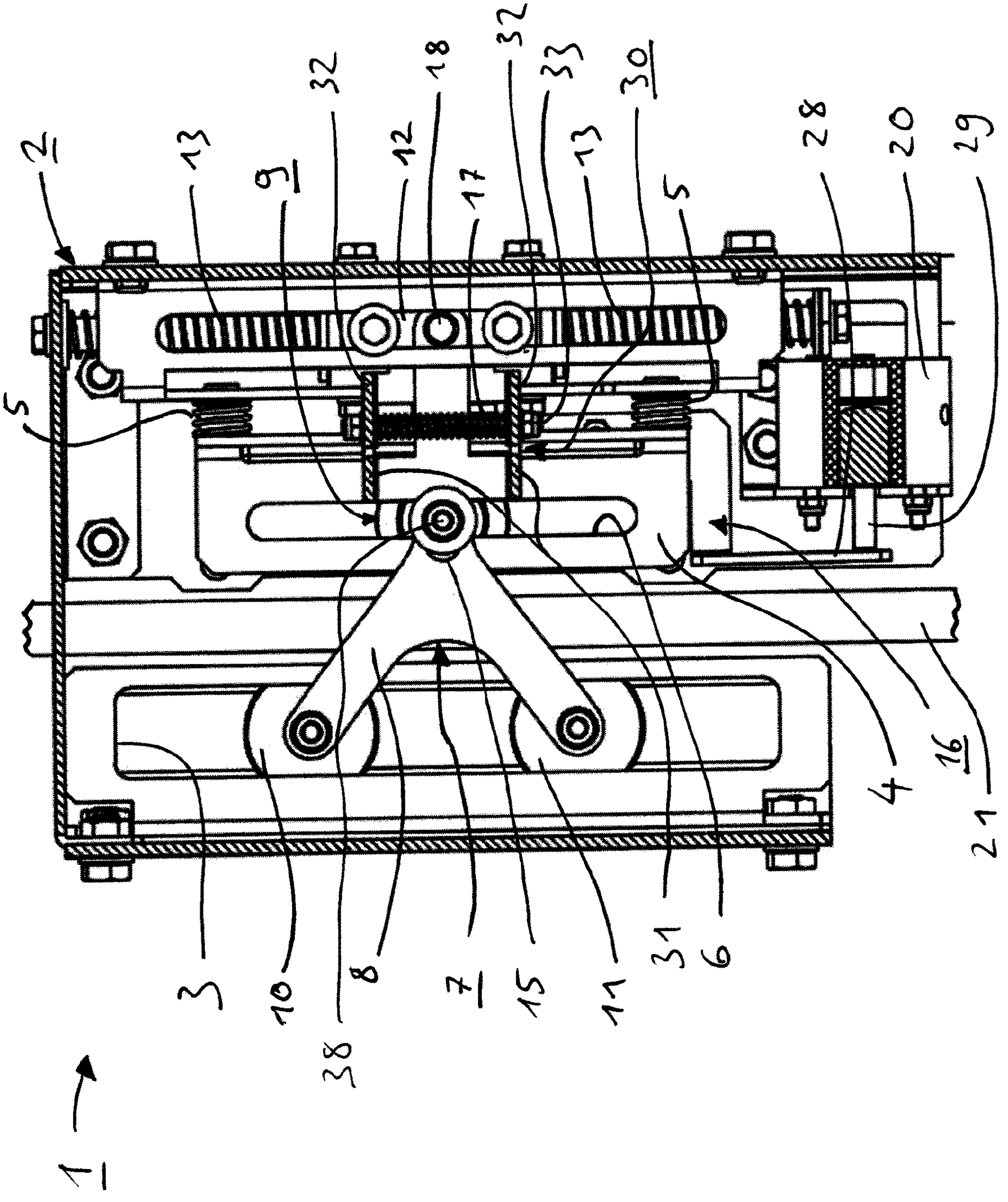

FIG. 4 Rear sectional view of the triggering unit in the untriggered state.

FIG. 5 Triggering unit during downward travel, at the beginning of the triggering process, at the moment when the first contact element has been moved towards the guide rail and is in contact with it, but has not yet swiveled the swivel lever, shown together with the elevator braking device.

Figure 6:
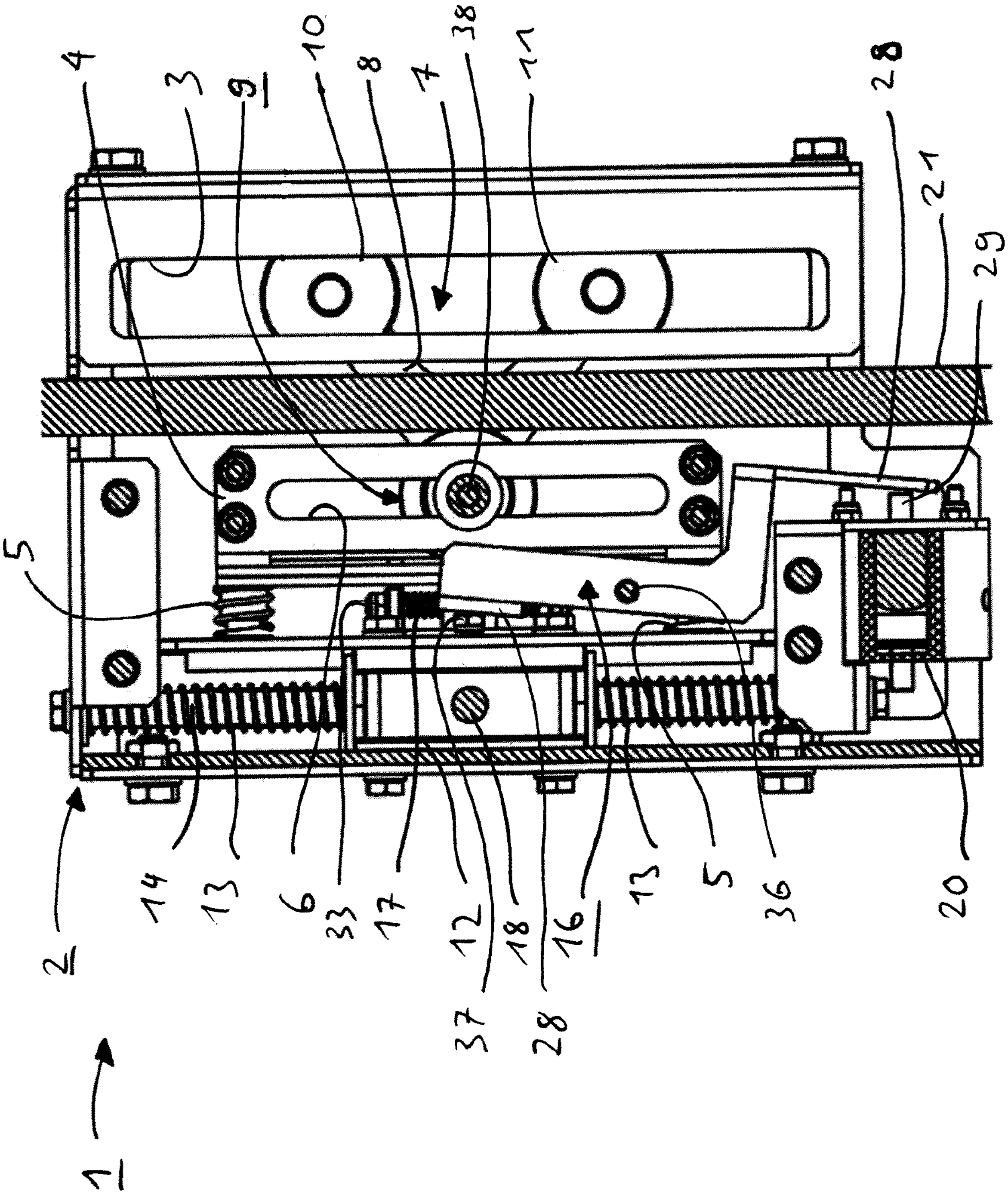

FIG. 6 front sectional view of the triggering unit at the moment shown by FIG. 5.

Figure 7:
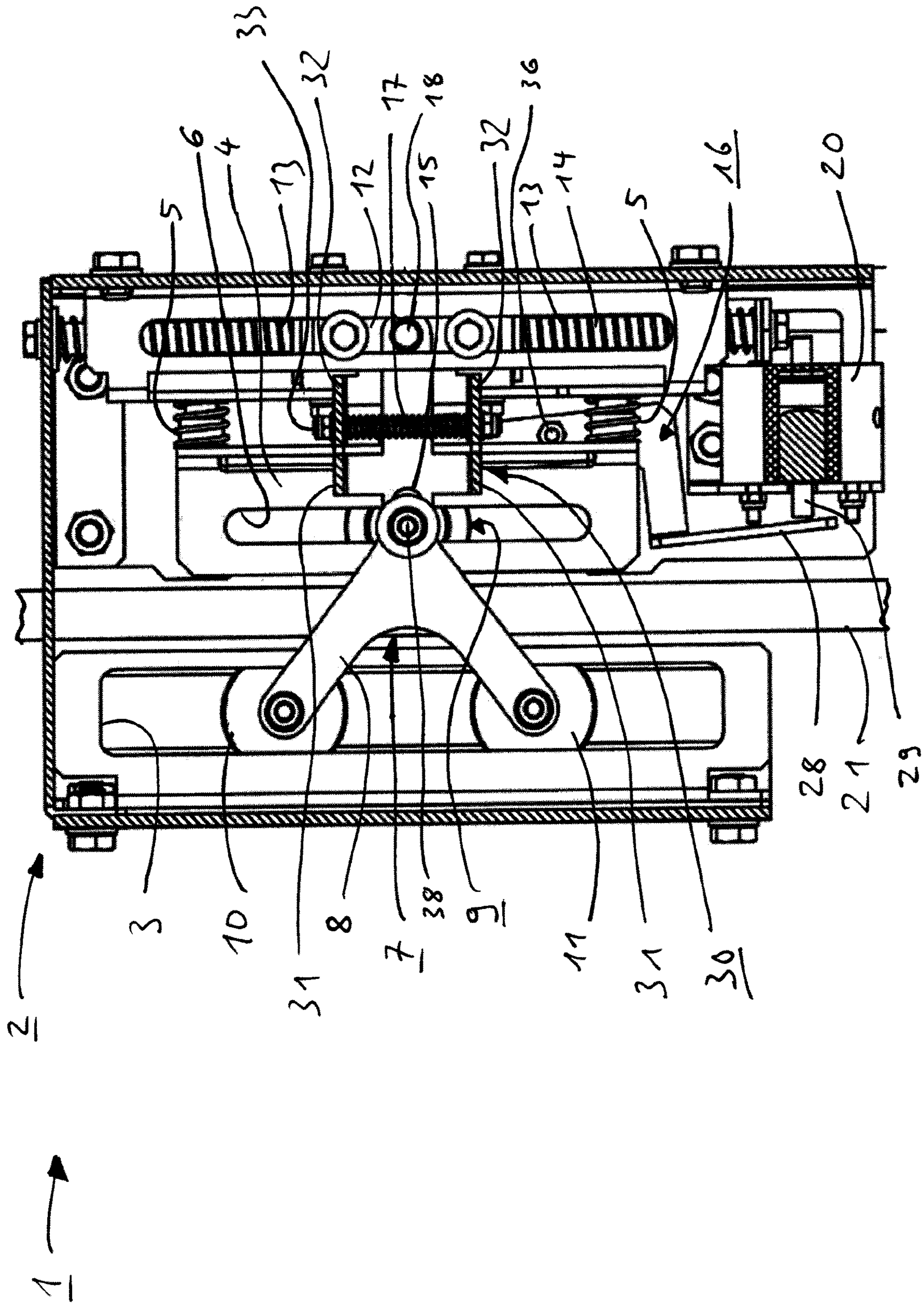

FIG. 7 rear sectional view of the triggering unit at the moment shown by FIG. 5.

Figure 8:
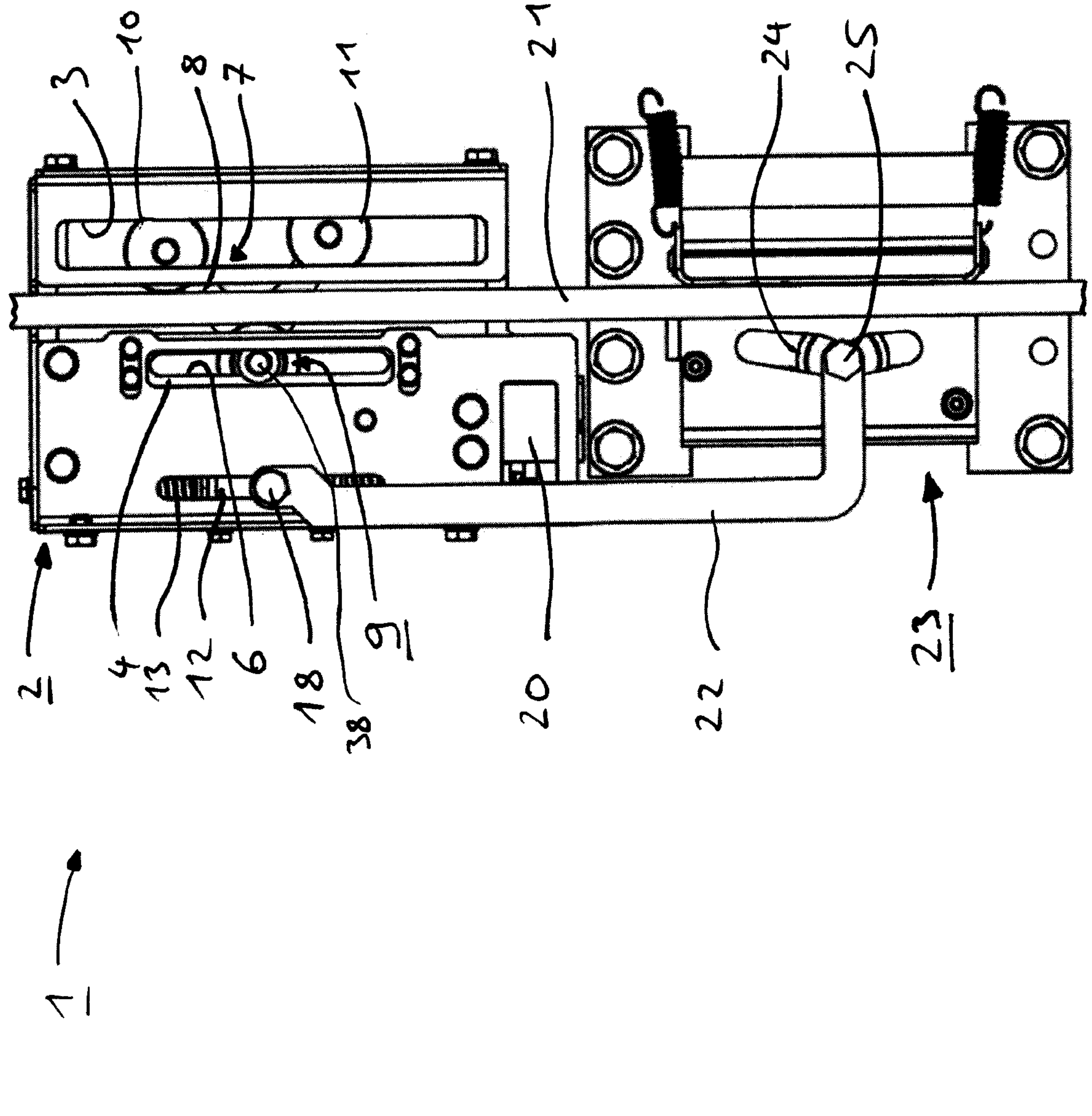

FIG. 8 Triggering unit at the beginning of the triggering process at a slightly later stage than shown in FIG. 5, namely after the swivel lever has been swiveled, shown together with the elevator braking device.

Figure 9:
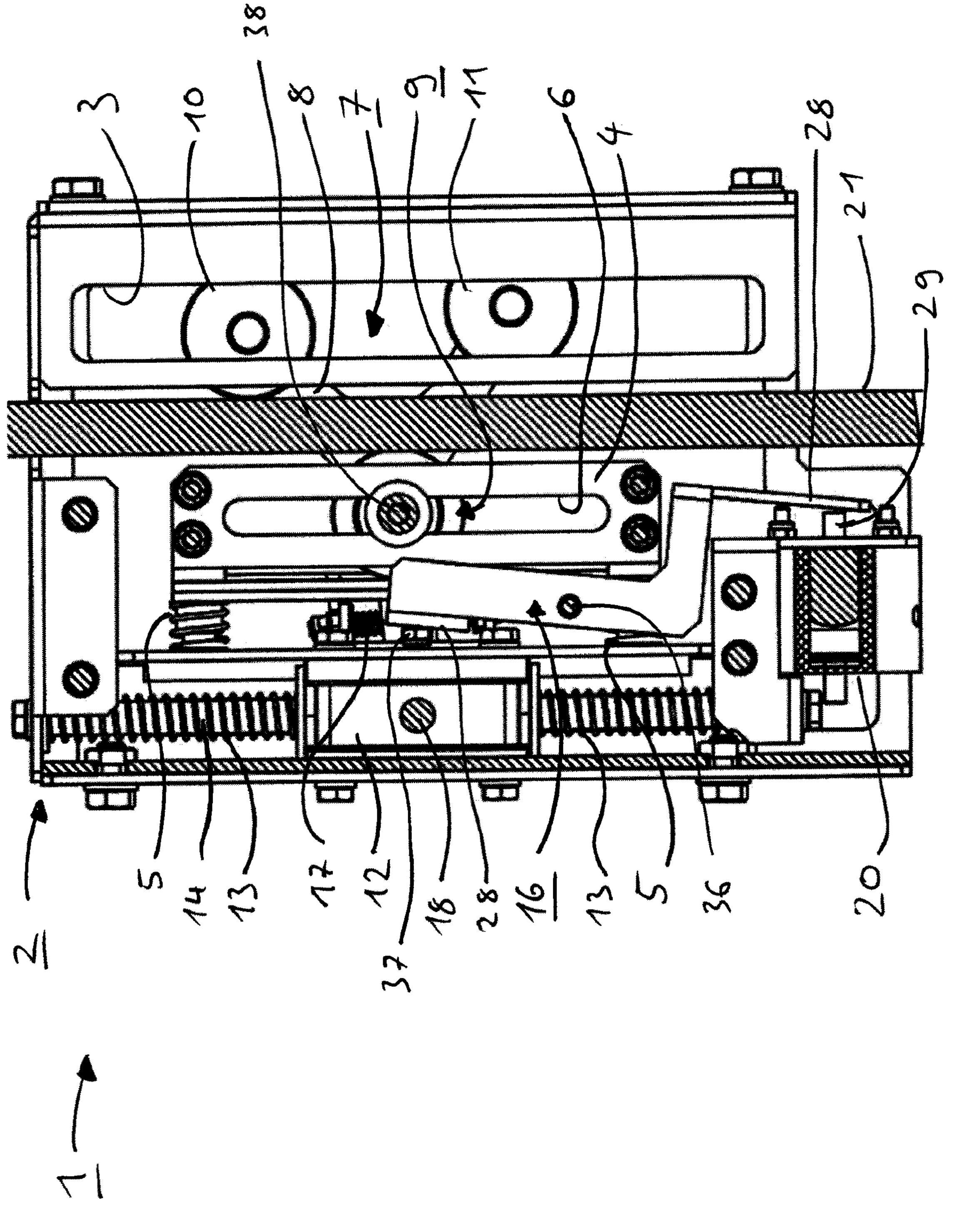

FIG. 9 front sectional view of the triggering unit at the moment shown by FIG. 8.

Figure 10:
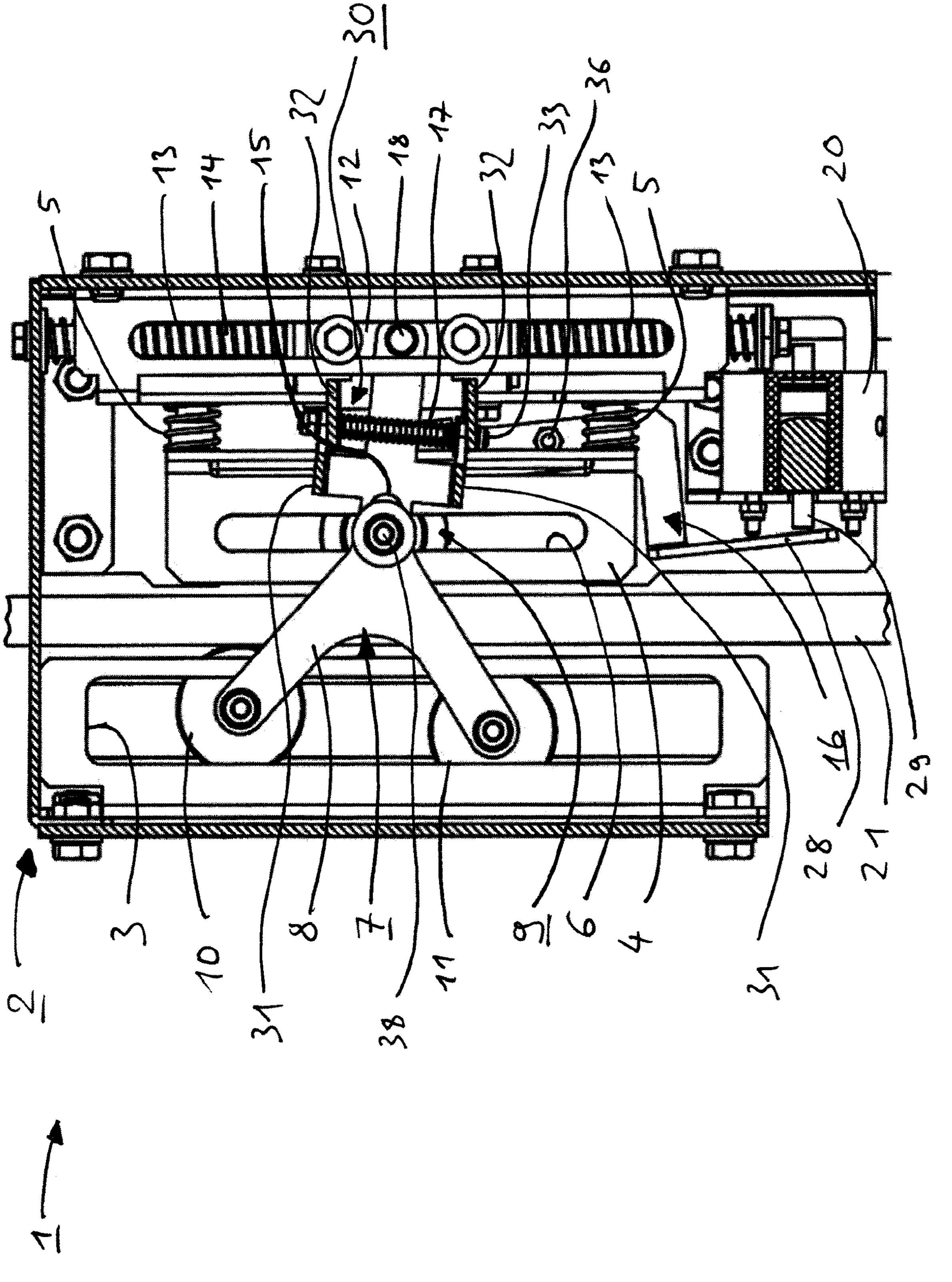

FIG. 10 rear sectional view of the triggering unit at the moment shown by FIG. 8.

Figure 11:
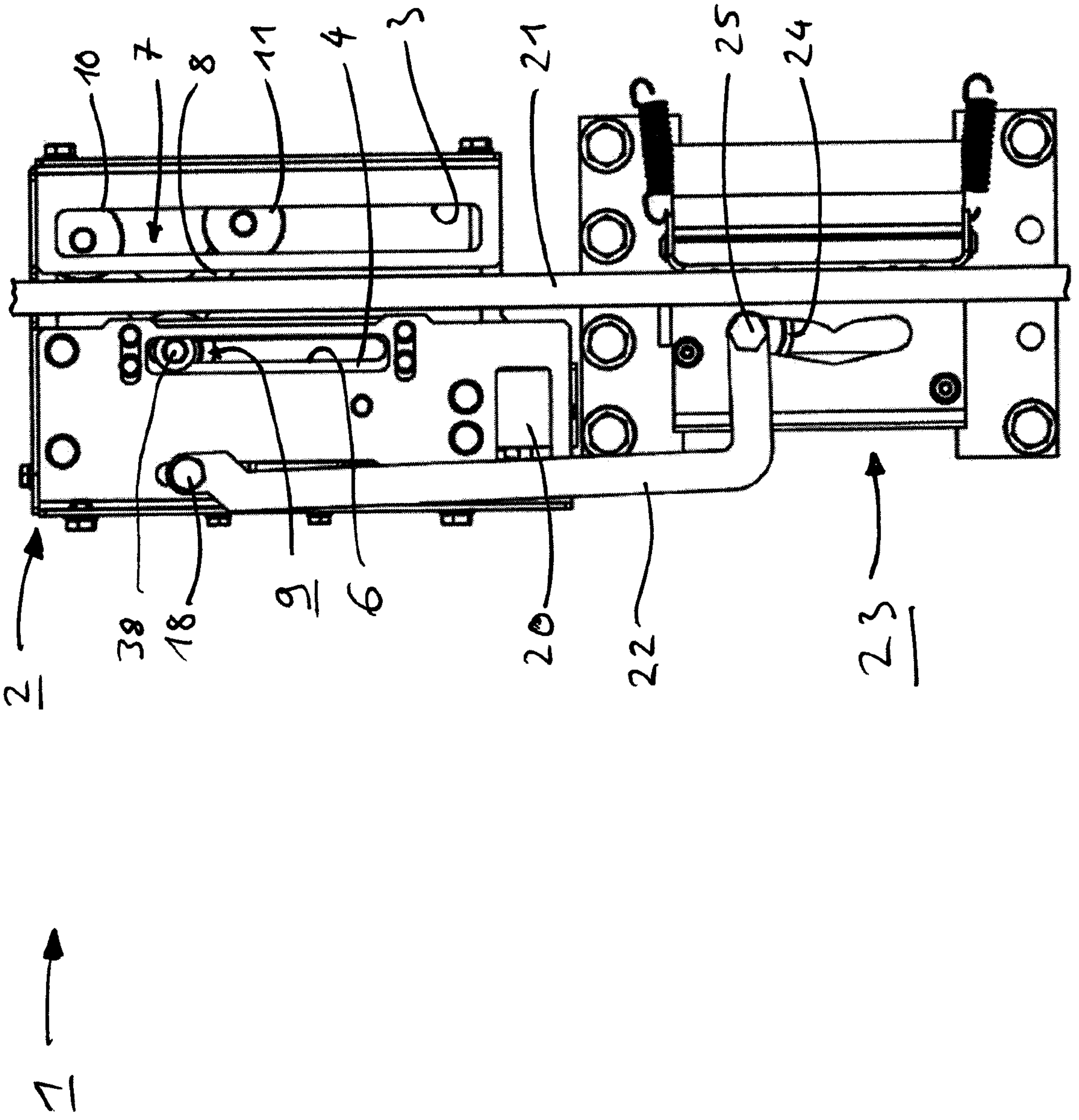

FIG. 11 Triggering unit with the coupling link in the fully triggered position during downward travel, shown together with the elevator braking device.

Figure 12:
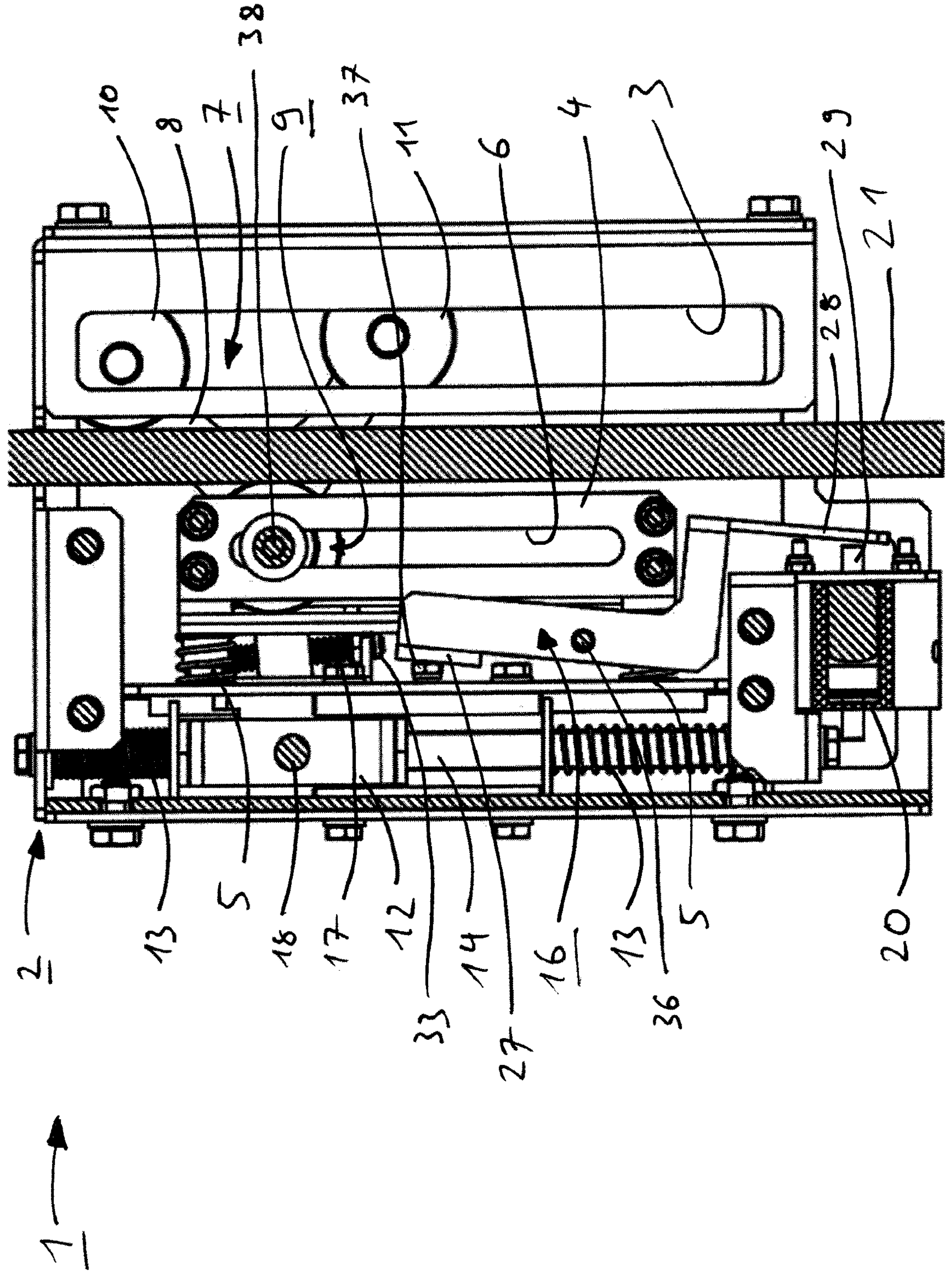

FIG. 12 front sectional view of the triggering unit at the moment shown by FIG. 11.

Figure 13:
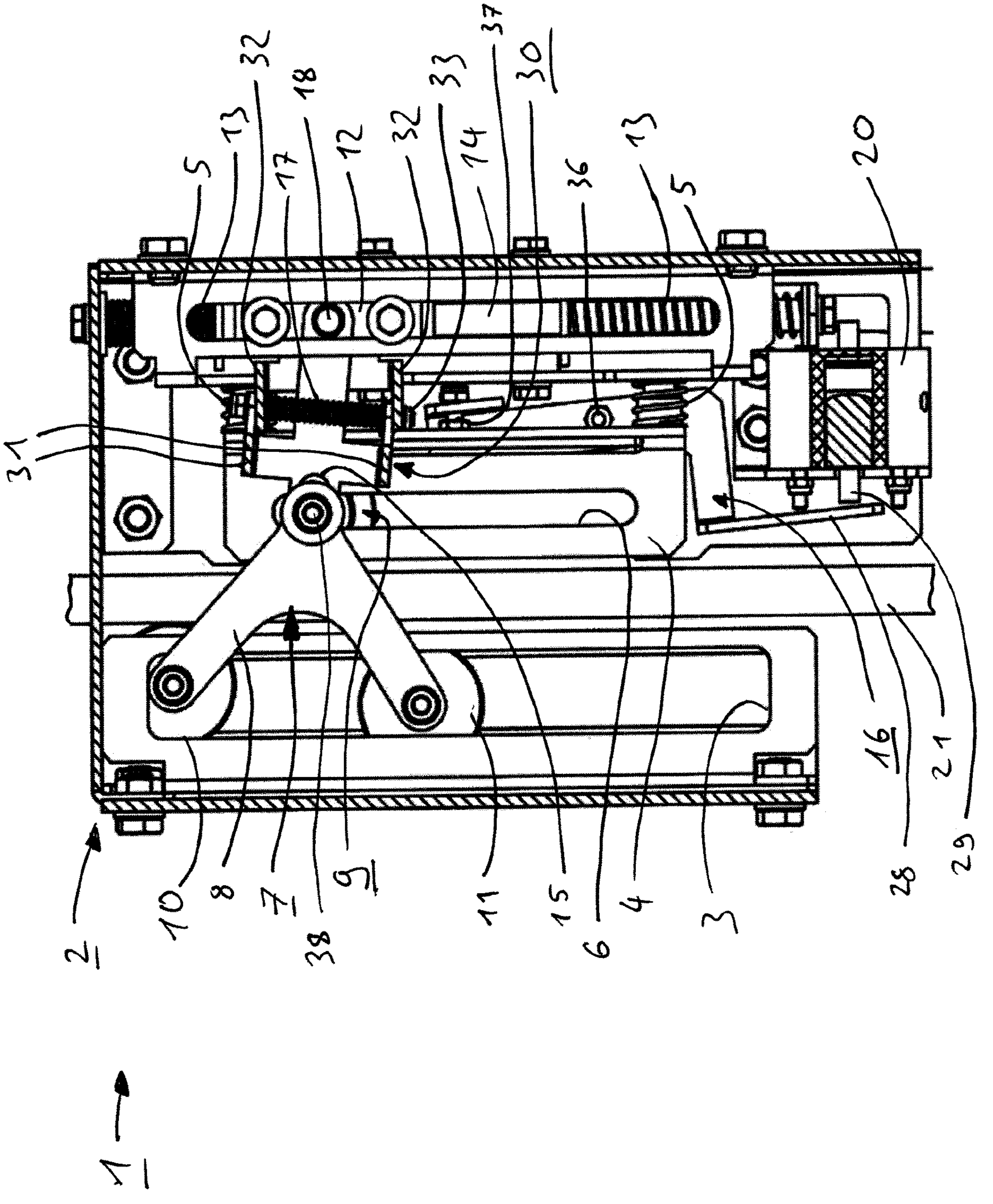

FIG. 13 rear sectional view of the triggering unit at the moment shown by FIG. 11.

Figure 14:
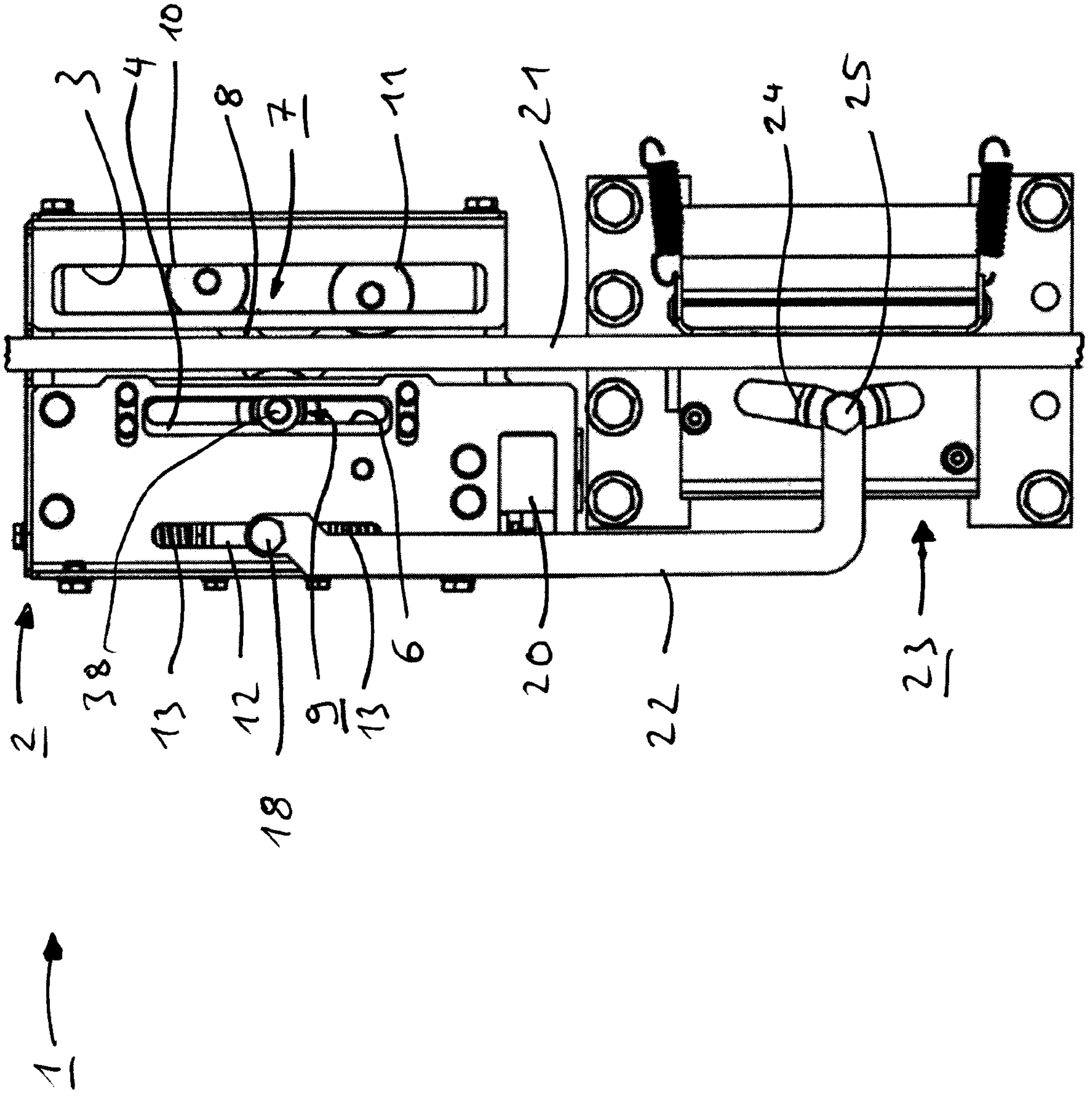

FIG. 14 Triggering unit responding during upward travel, after swiveling the swivel lever, analogous to FIG. 8.

Figure 15:
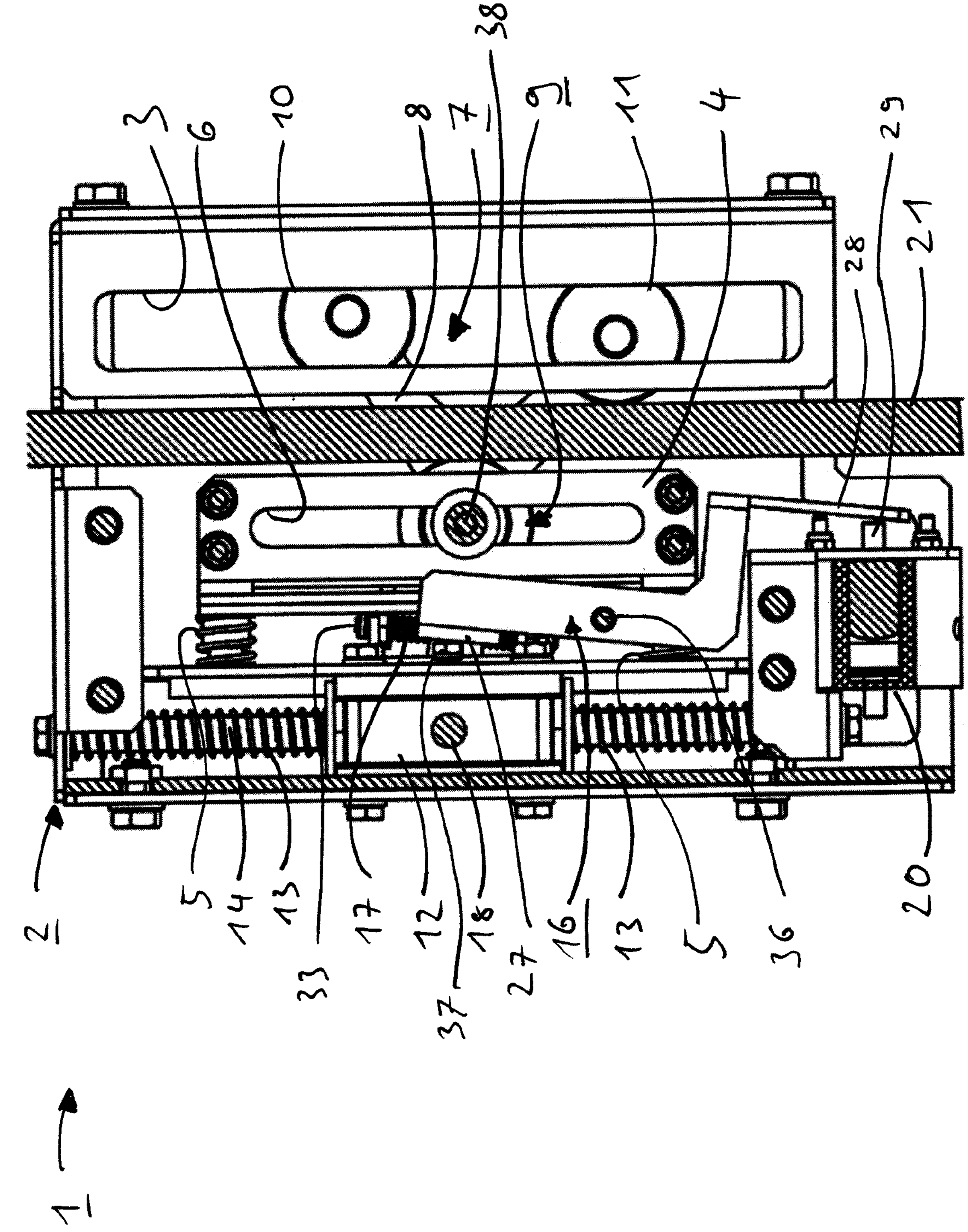

FIG. 15 front sectional view of the triggering unit at the moment shown by FIG. 14.

Figure 16:
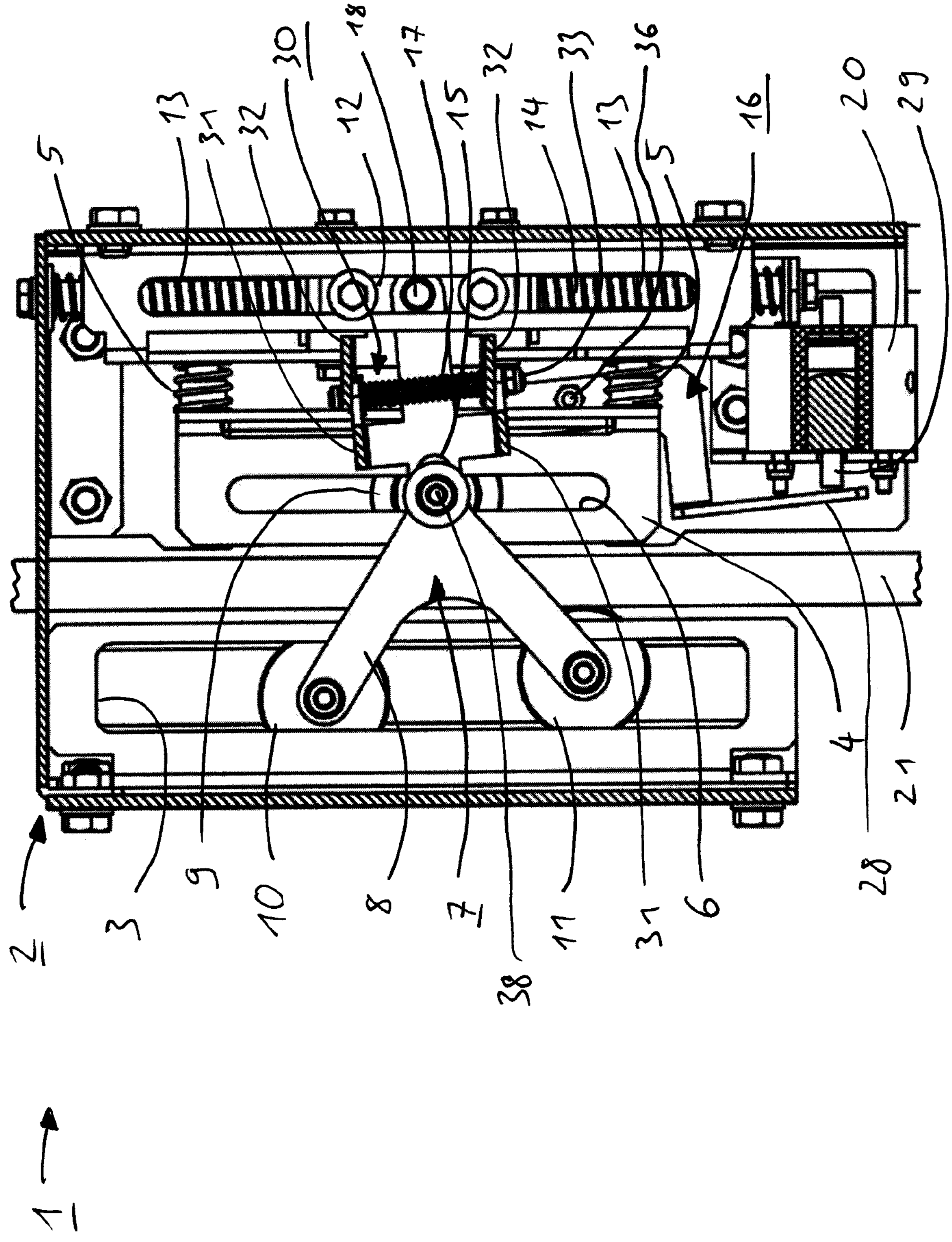

FIG. 16 rear sectional view of the triggering unit at the moment shown by FIG. 14.

Figure 17:
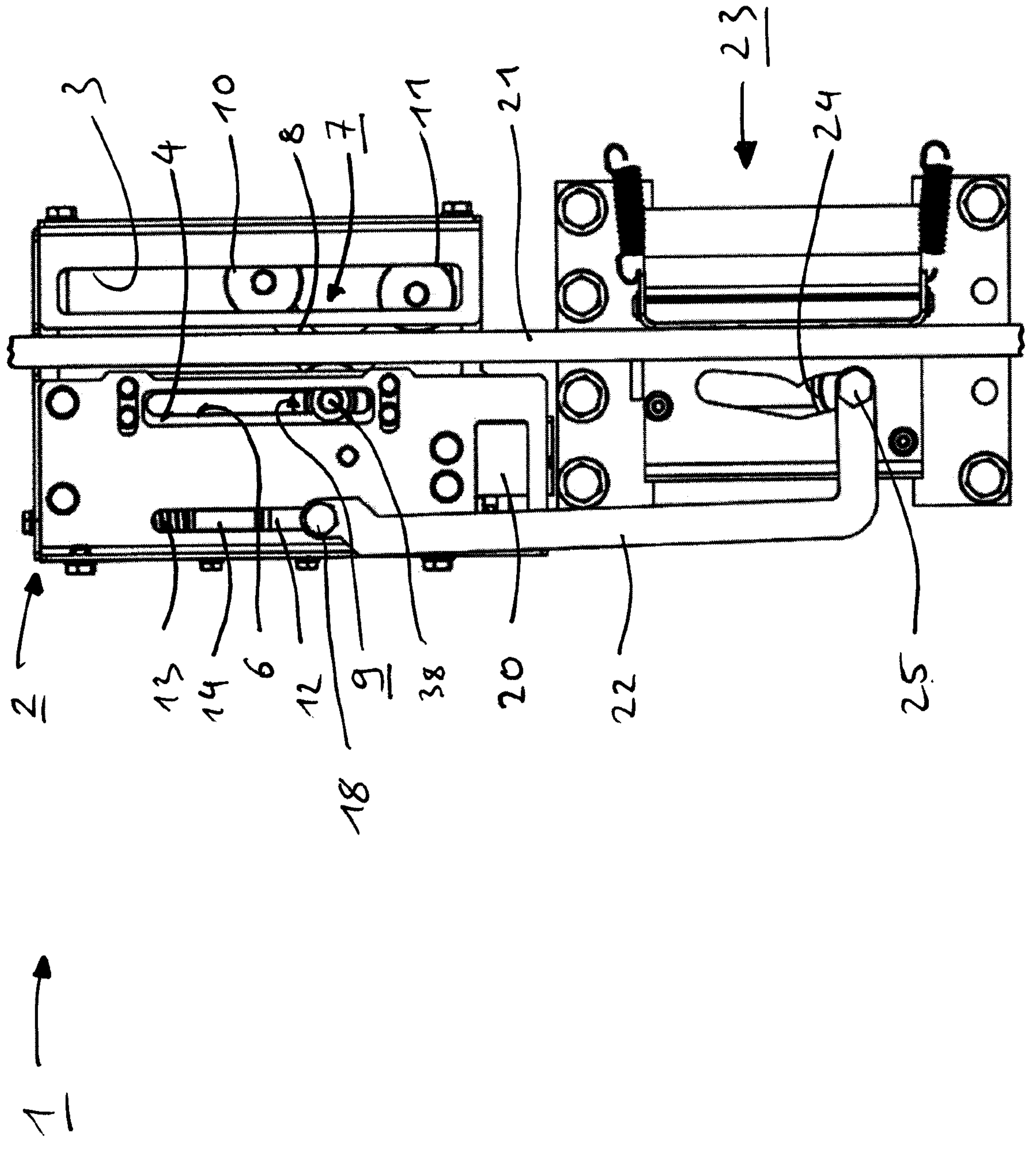

FIG. 17 Triggering unit with the coupling link in the fully triggered position during upward travel, shown together with the elevator braking device, analogous to FIG. 11.

Figure 18:
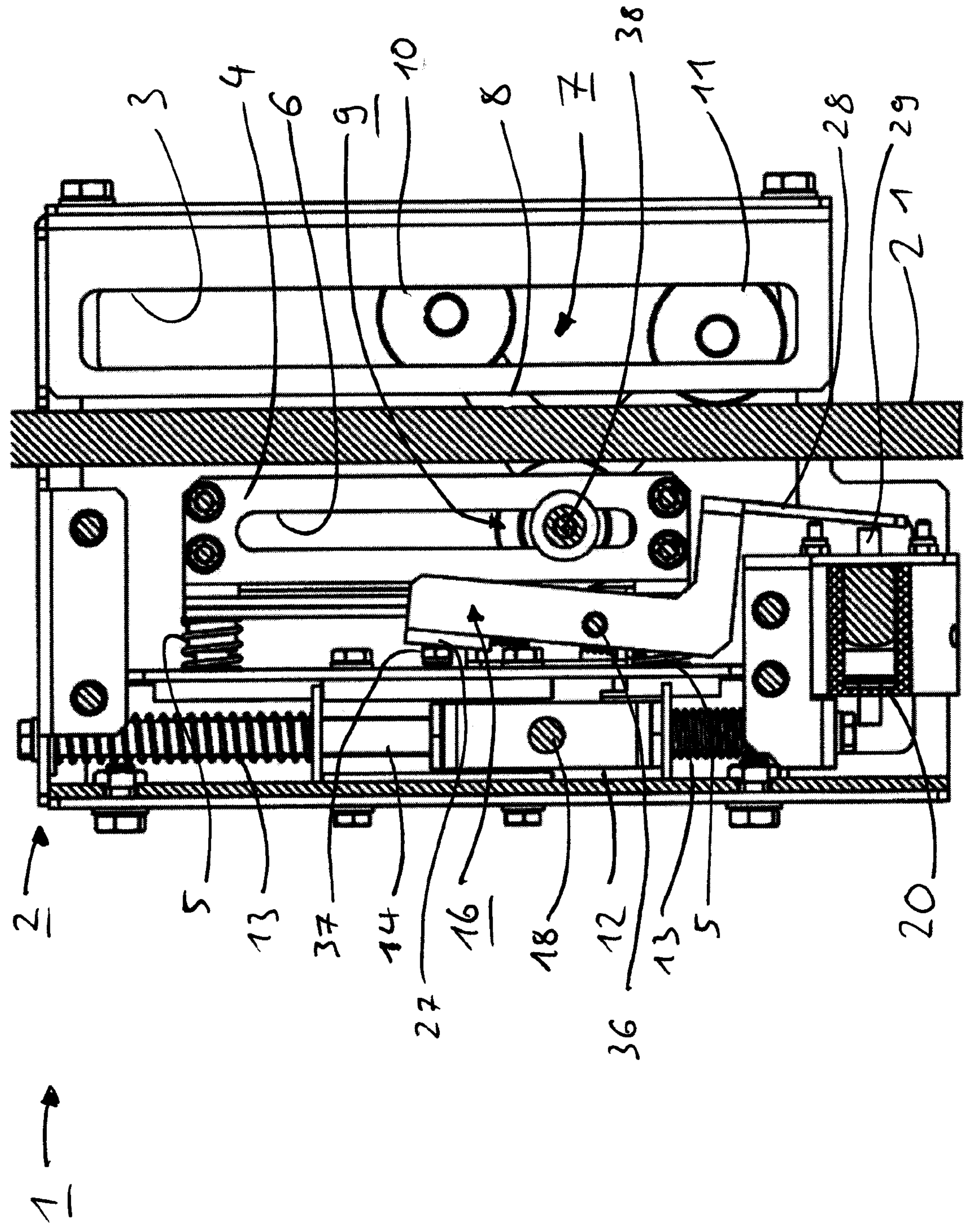

FIG. 18 front sectional view of the triggering unit at the moment shown by FIG. 17.

Figure 19:
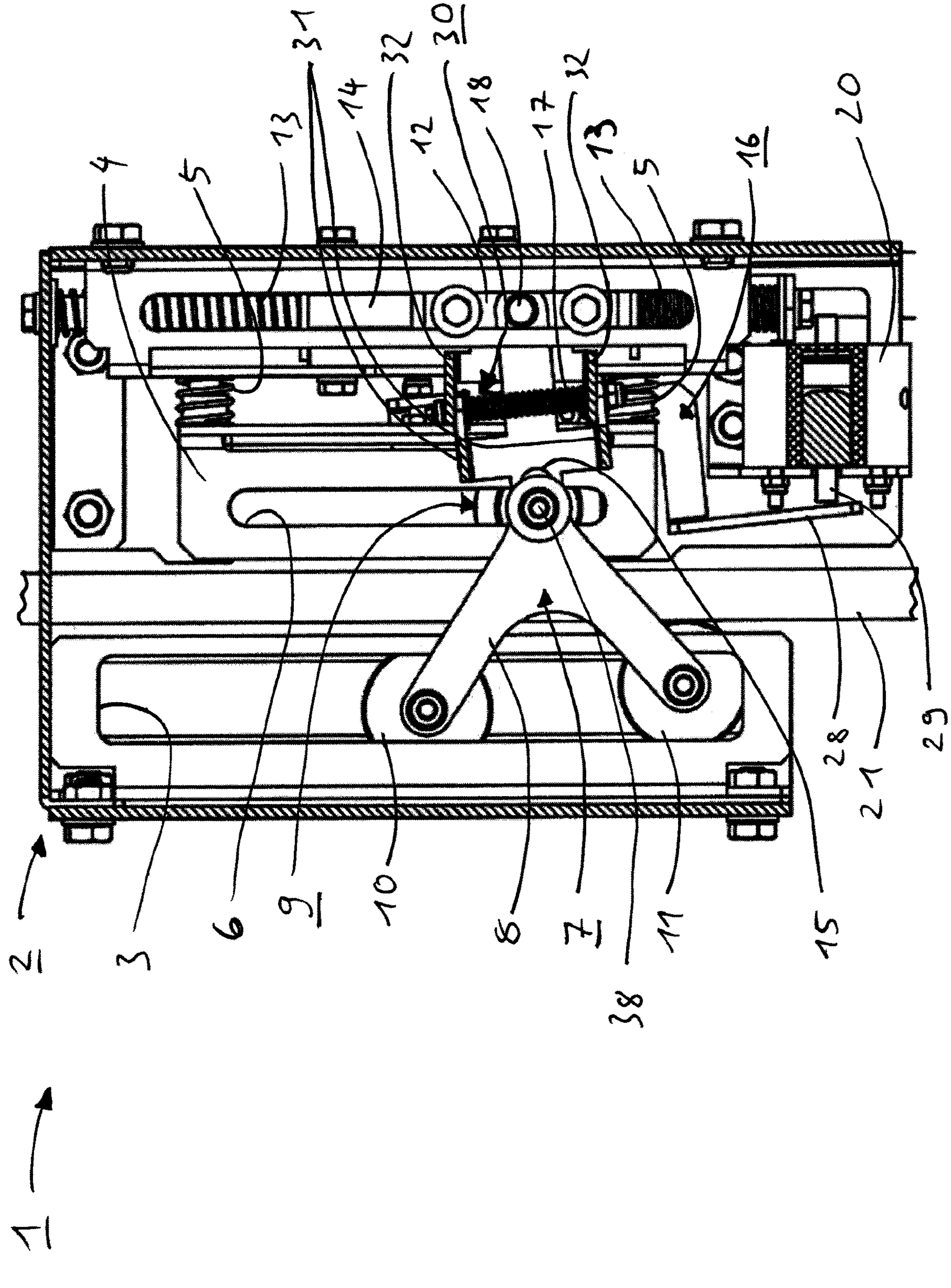

FIG. 19 rear sectional view of the triggering unit at the moment shown by FIG. 17.

Figure 20:
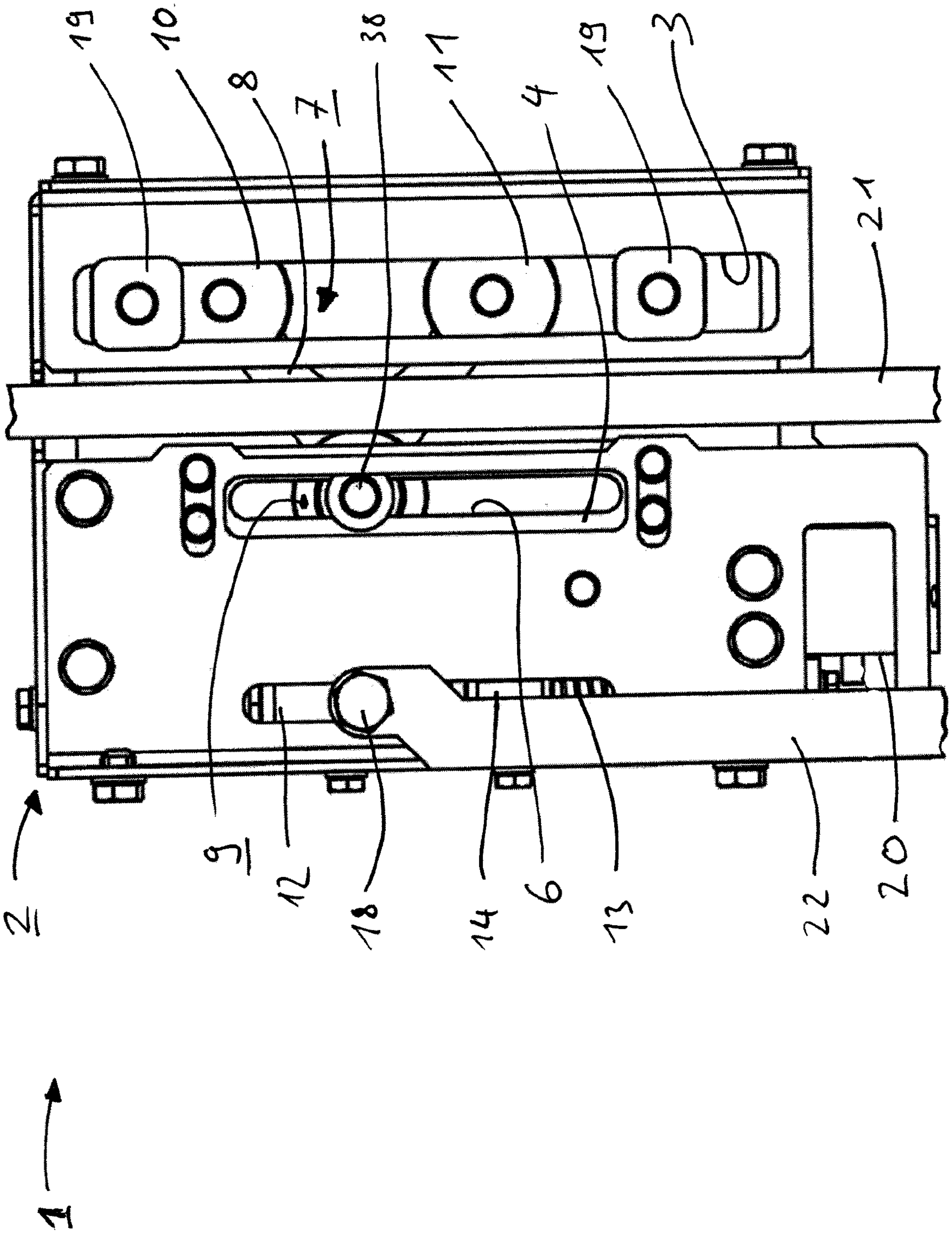

FIG. 20 Triggering unit equipped with adjustable stops, in the state of abutment of the second contact element against one of the stops.

Figure 21:
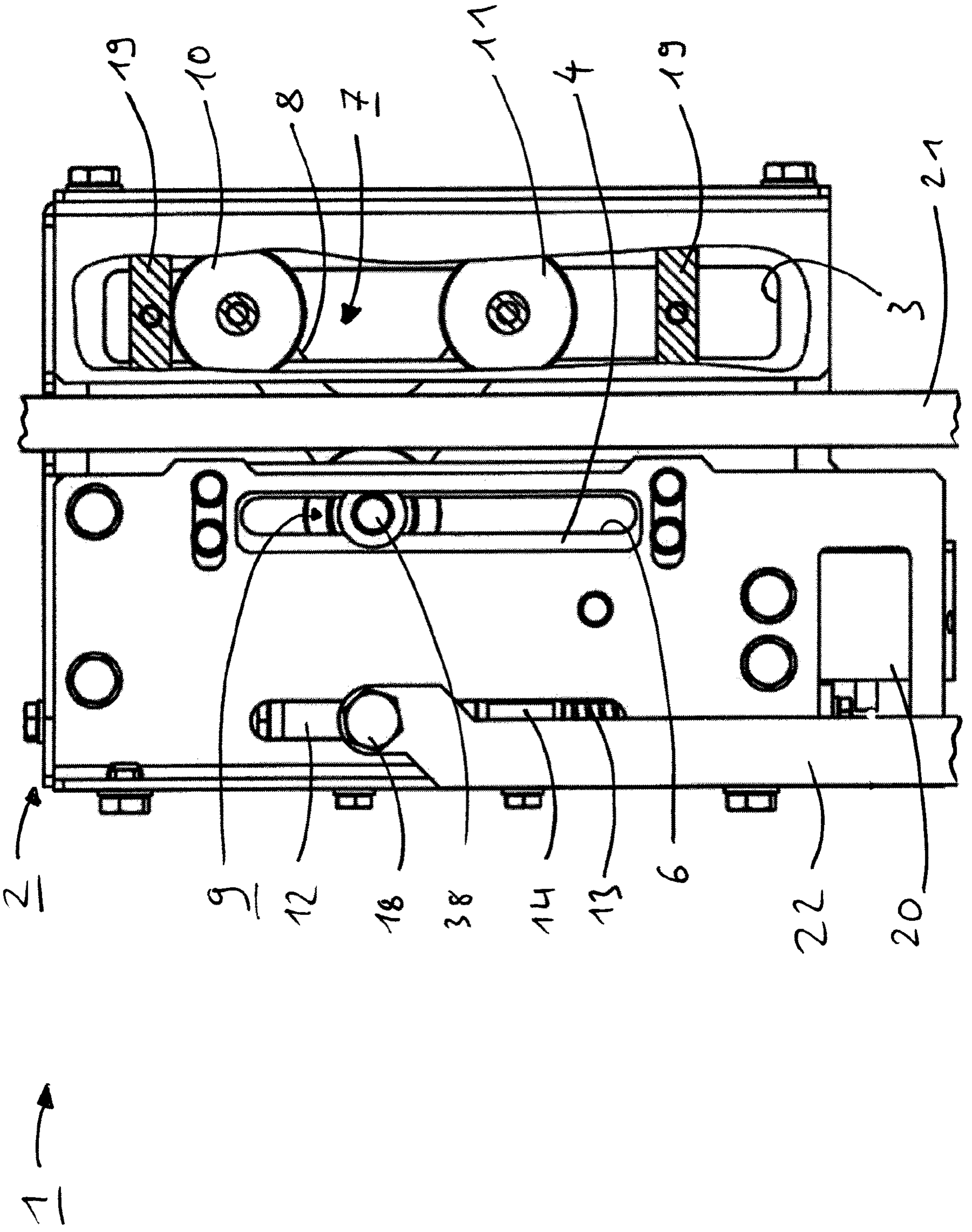

FIG. 21 Front sectional view of the triggering unit of FIG. 20.

Figure 22:
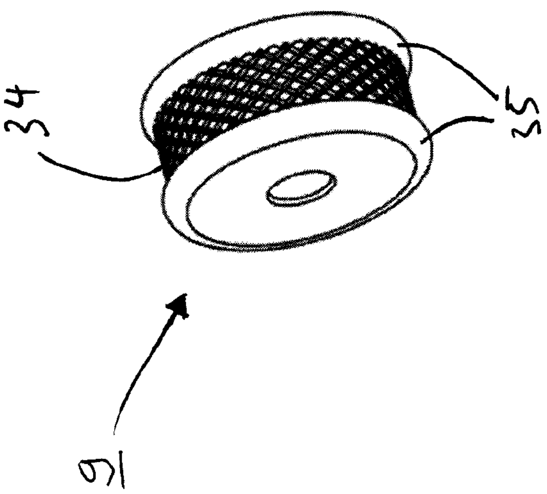

FIG. 22 embodiment of the second and third contact elements.

Figure 23:
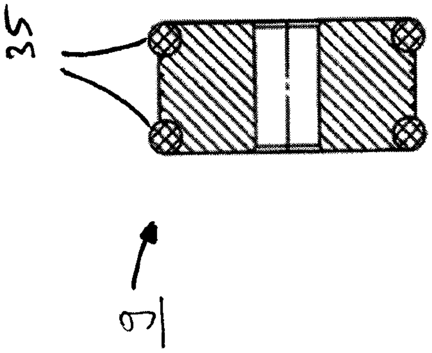

FIG. 23 Sectional view of the embodiment of the second and third contact elements of FIG. 22.

Figure 24:
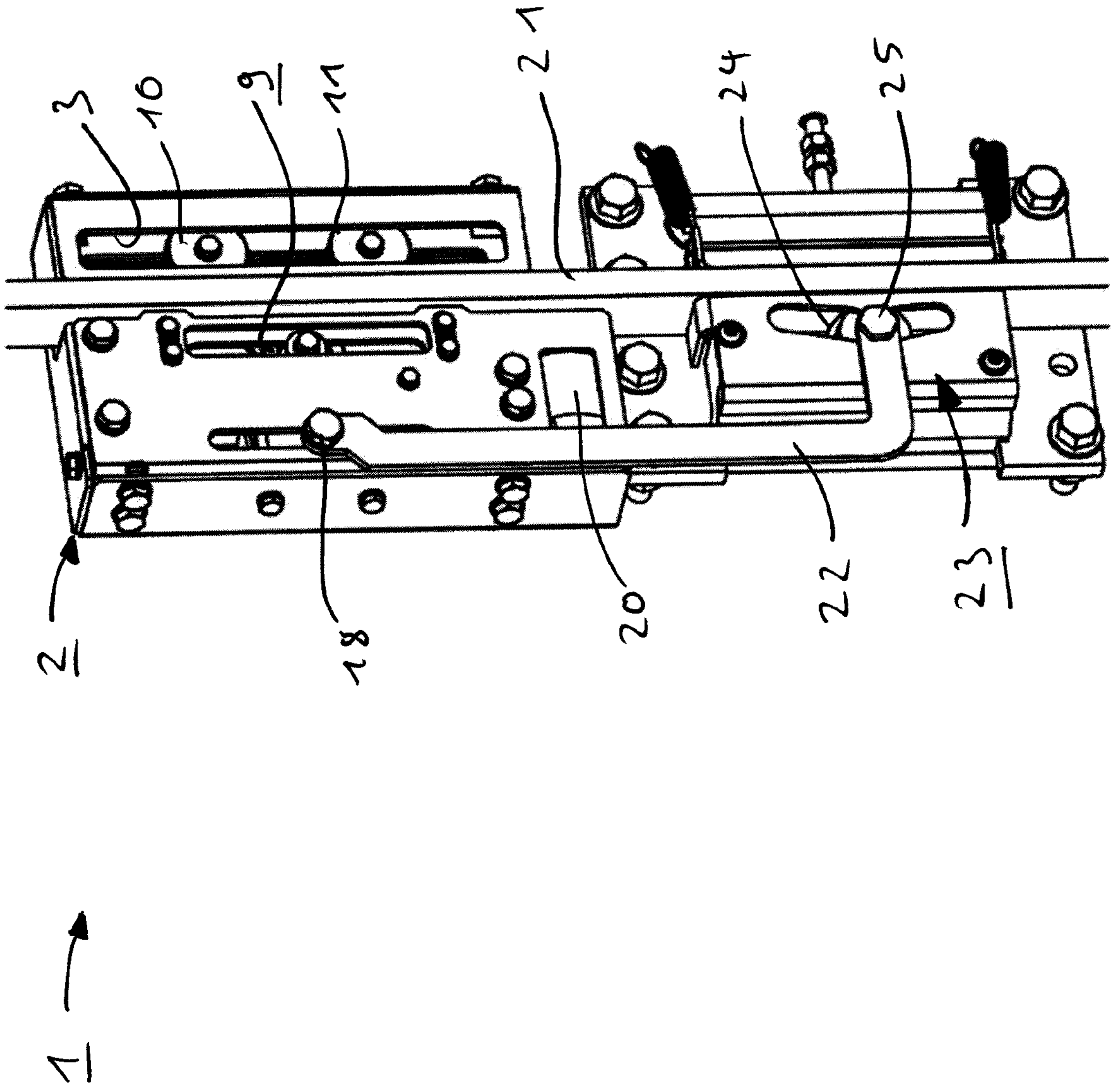

FIG. 24 Isometric front view of the triggering unit together with the elevator braking device of FIG. 1.

Figure 25:
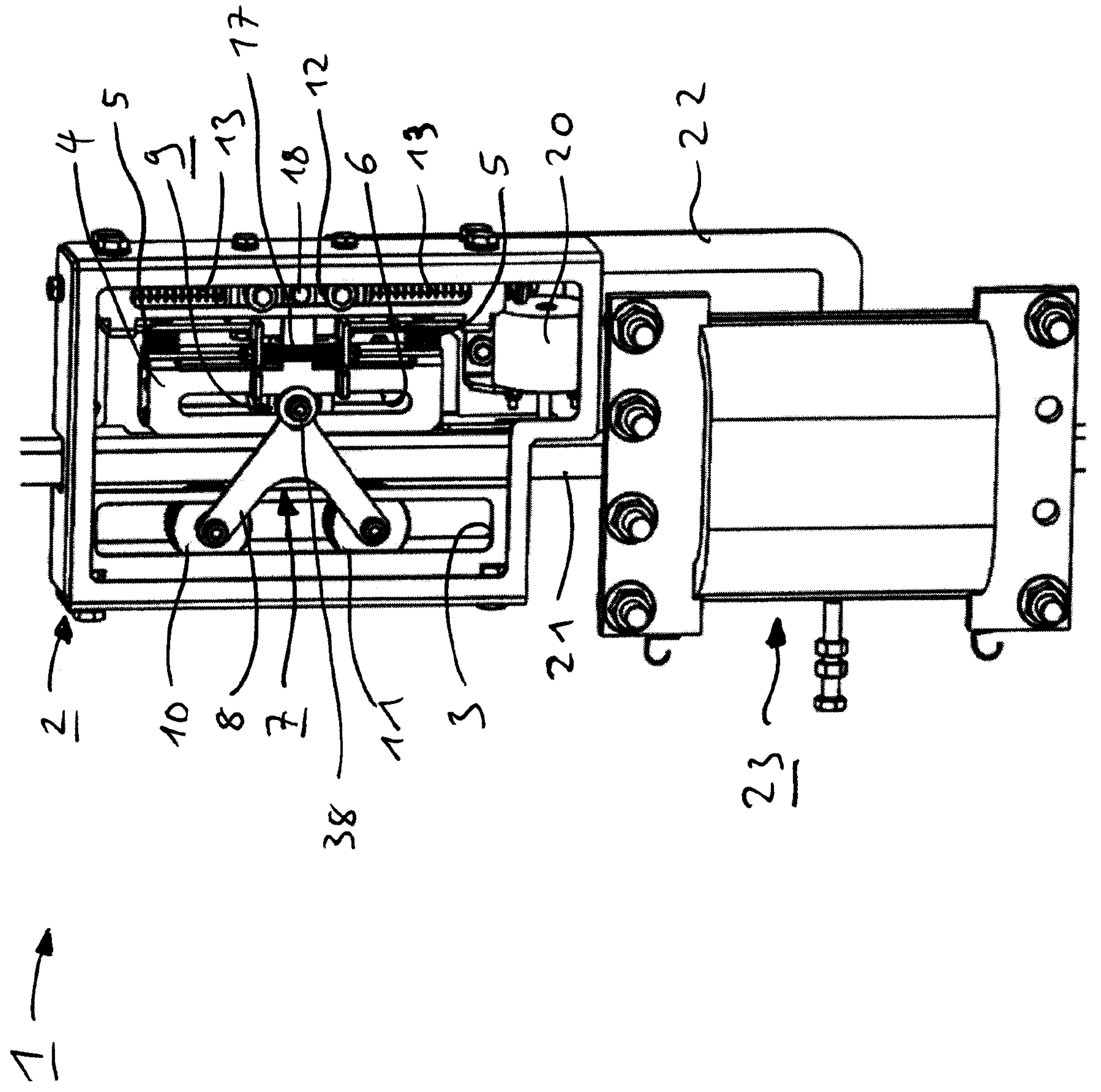

FIG. 25 Isometric rear view of the triggering unit together with the elevator braking device of FIG. 1.

Figure 26:
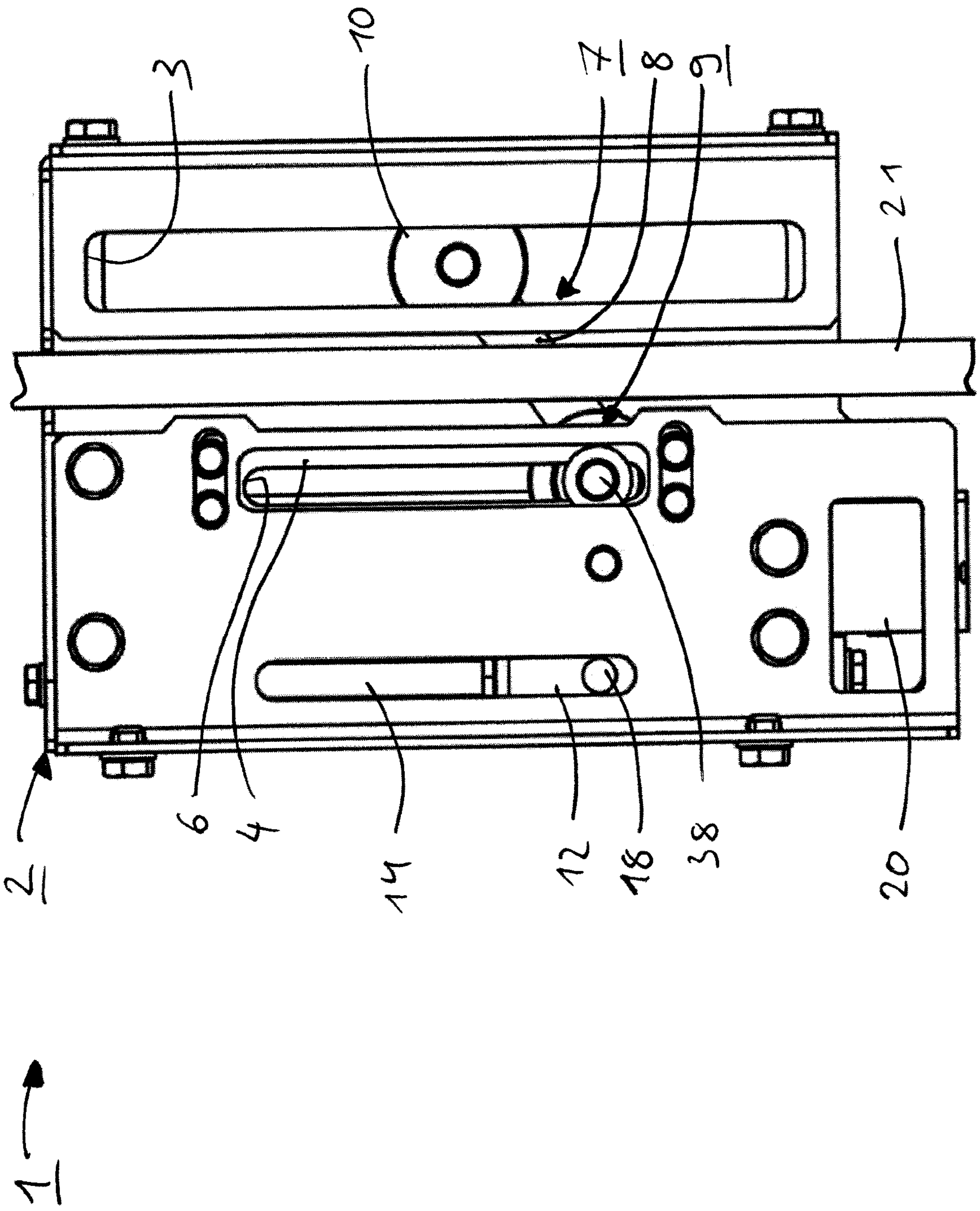

FIG. 26 Embodiment of the triggering unit without third contact element in the untriggered state.

Figure 27:
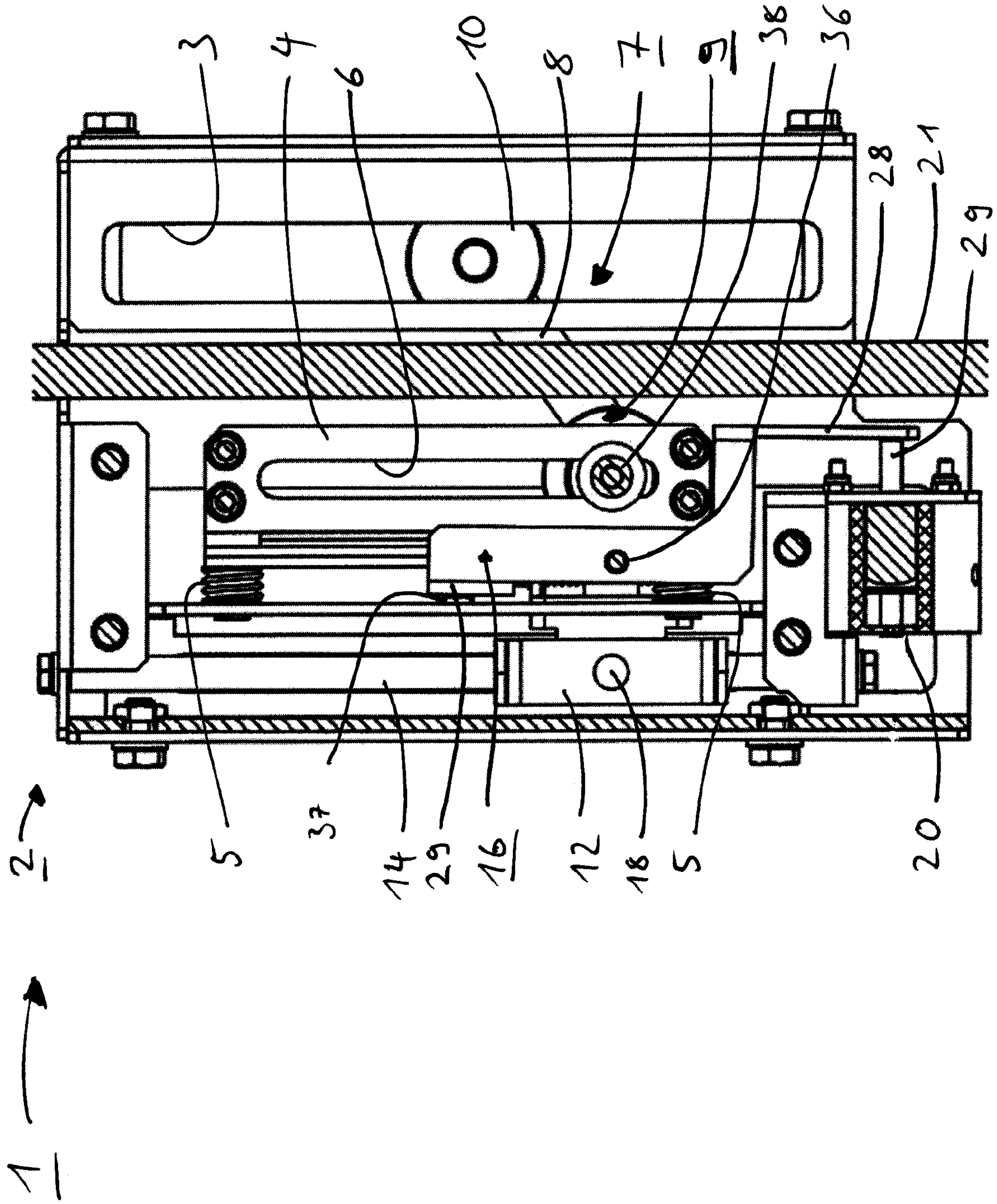

FIG. 27 Front sectional view of the triggering unit of FIG. 26.

Figure 28:
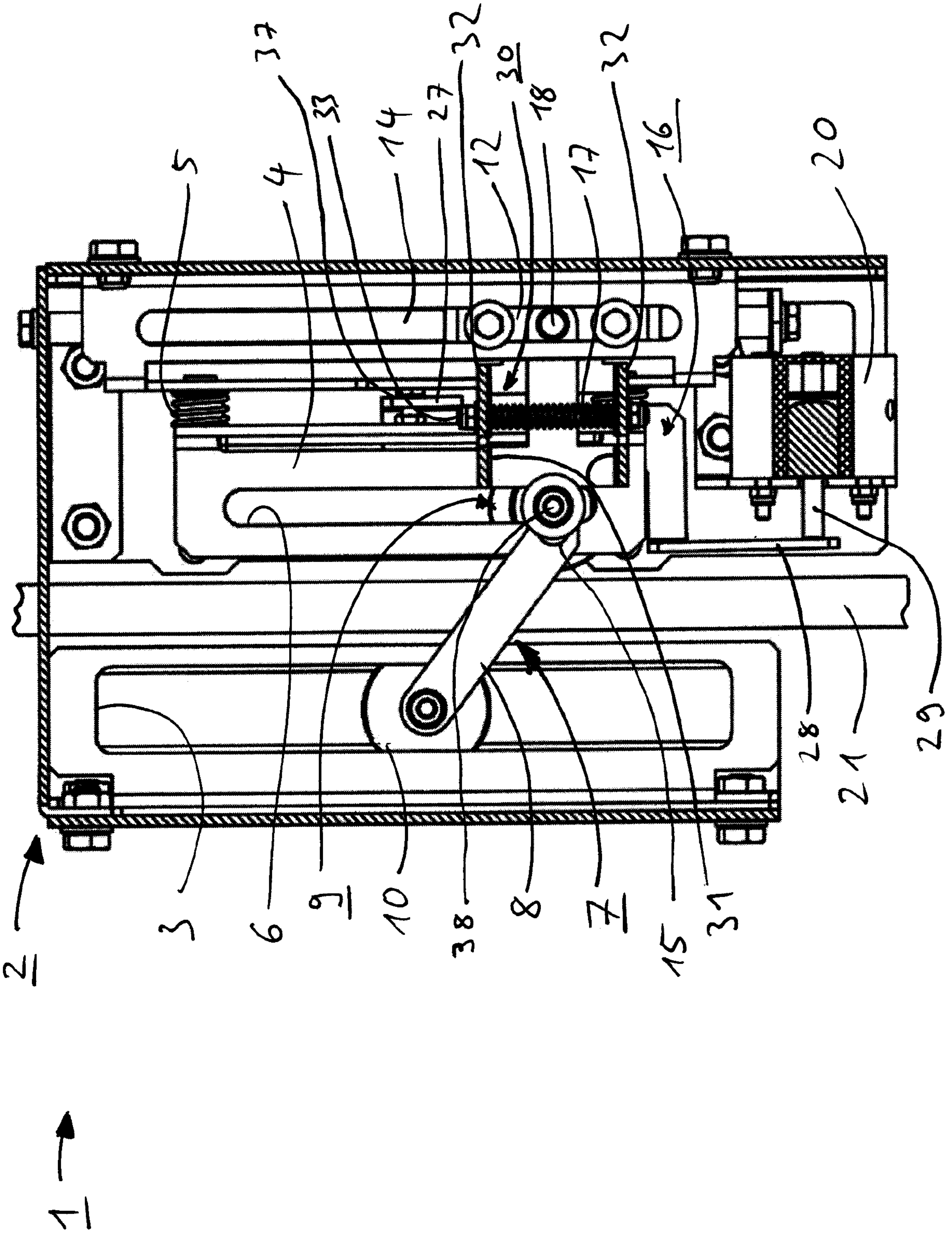

FIG. 28 Rear sectional view of the triggering unit of FIG. 27.

Figure 29:
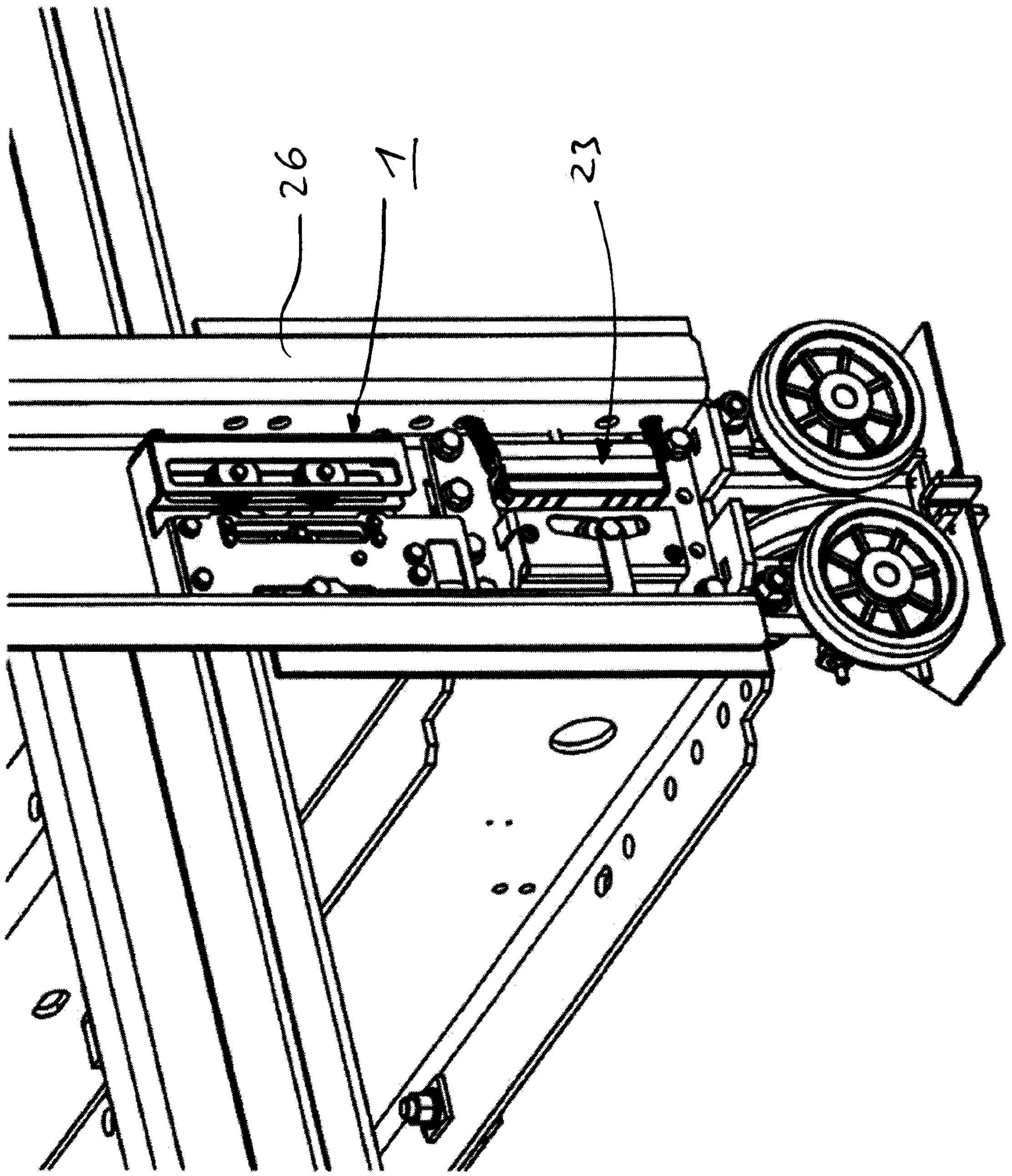

FIG. 29 Triggering unit together with the elevator braking device from view 1, installed in side beams of the car.

Figure 30A:
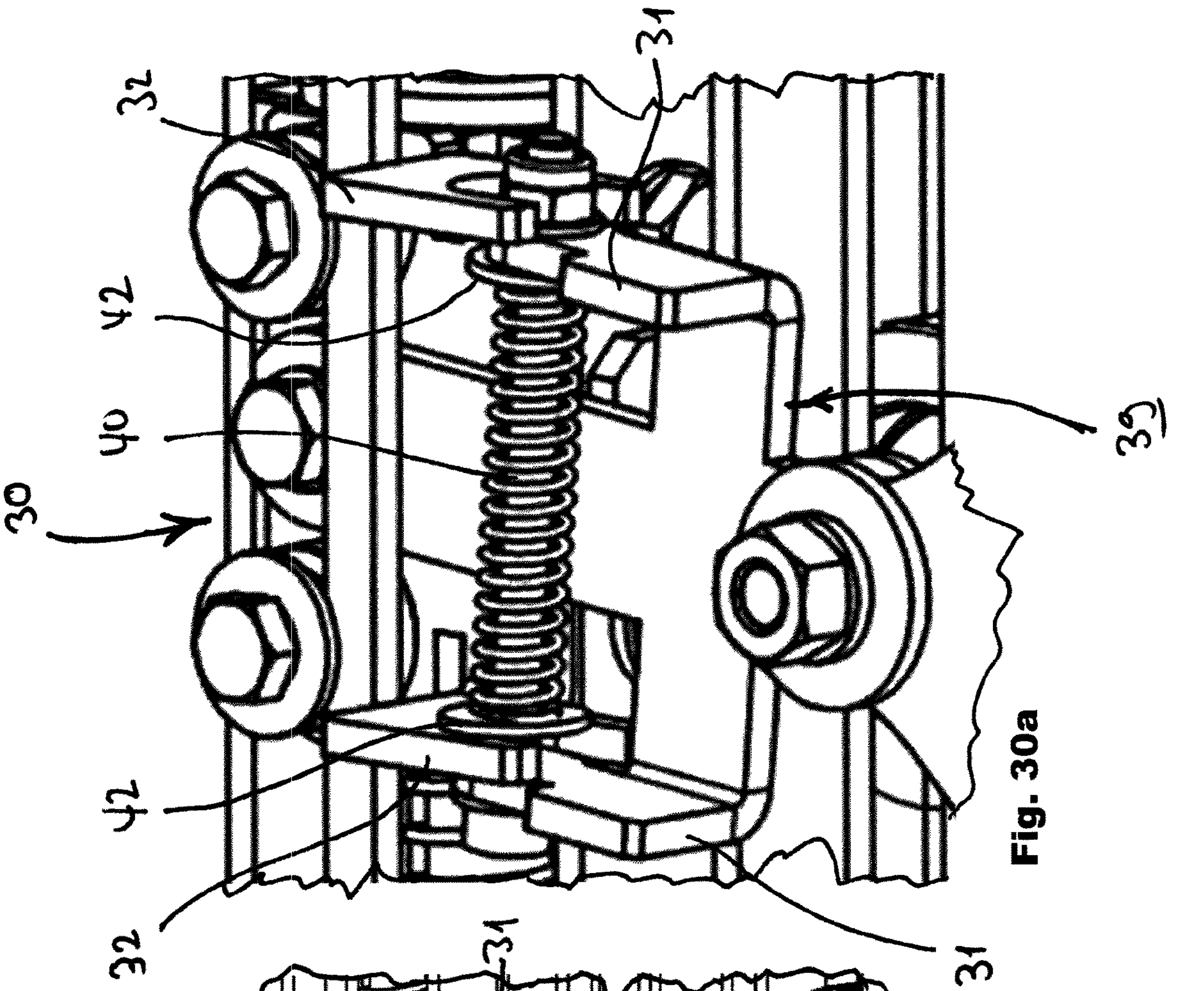
Figure 30:
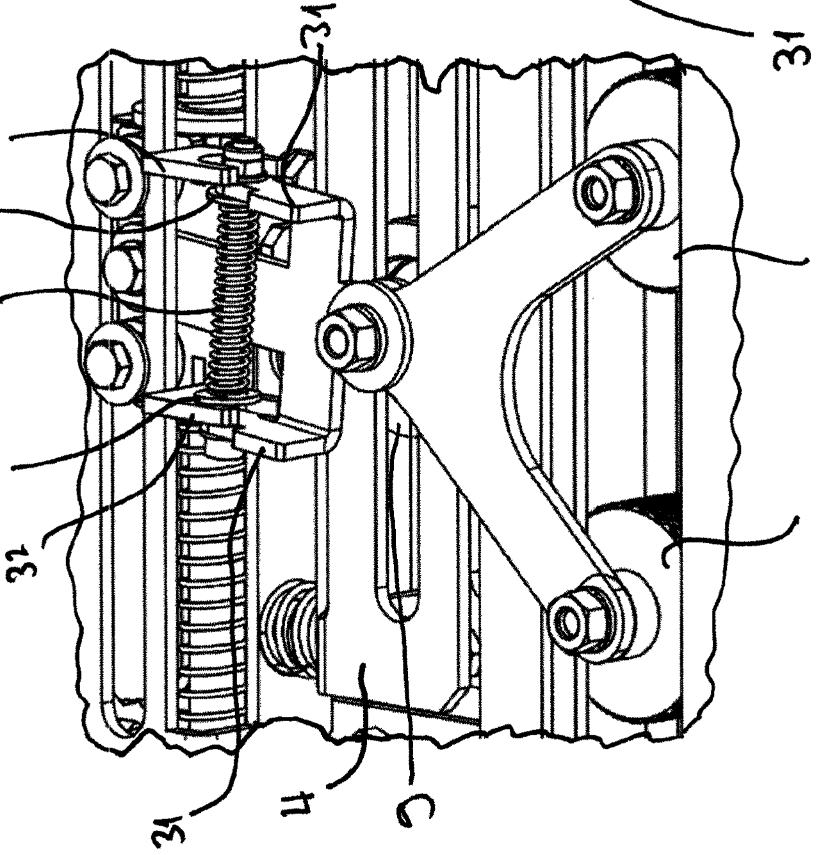

FIG. 30 Section showing the resetting element corresponding to the situation shown in FIG. 10.

FIG. 30*a* Detail enlargement from FIG. 30.

Figure 31A:
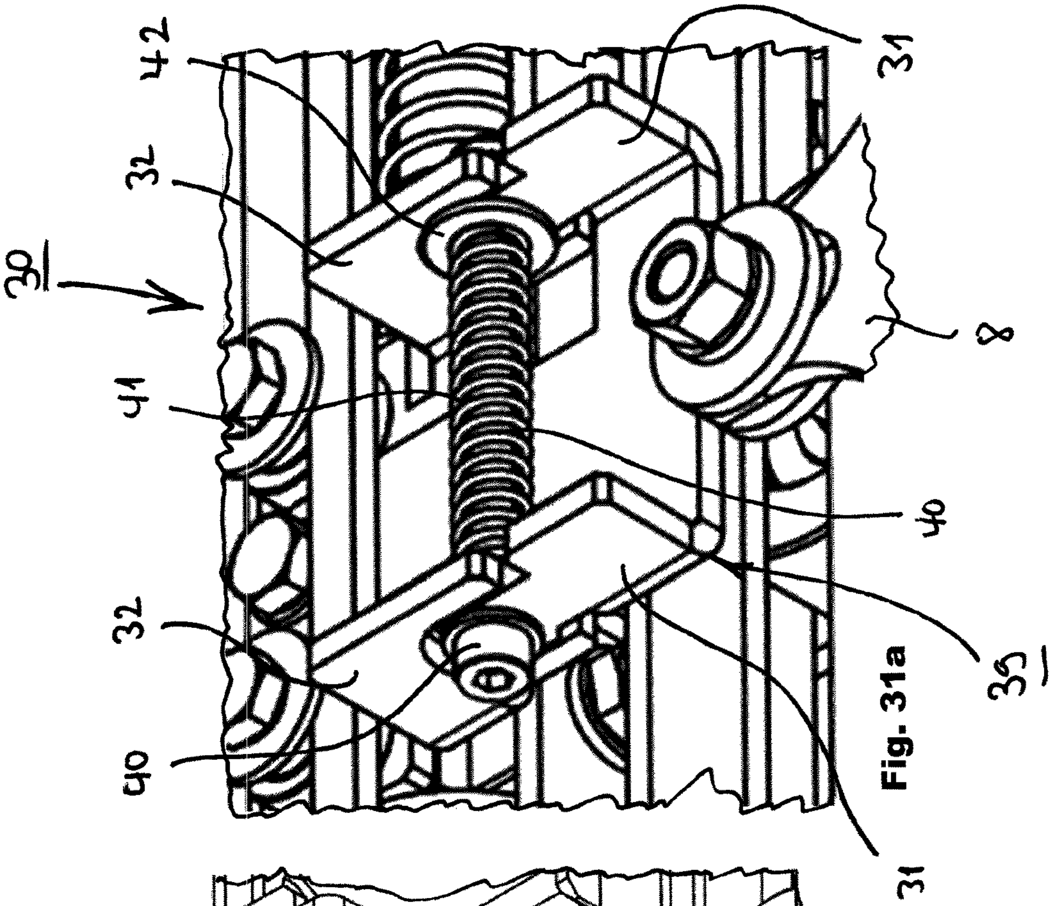
Figure 31:
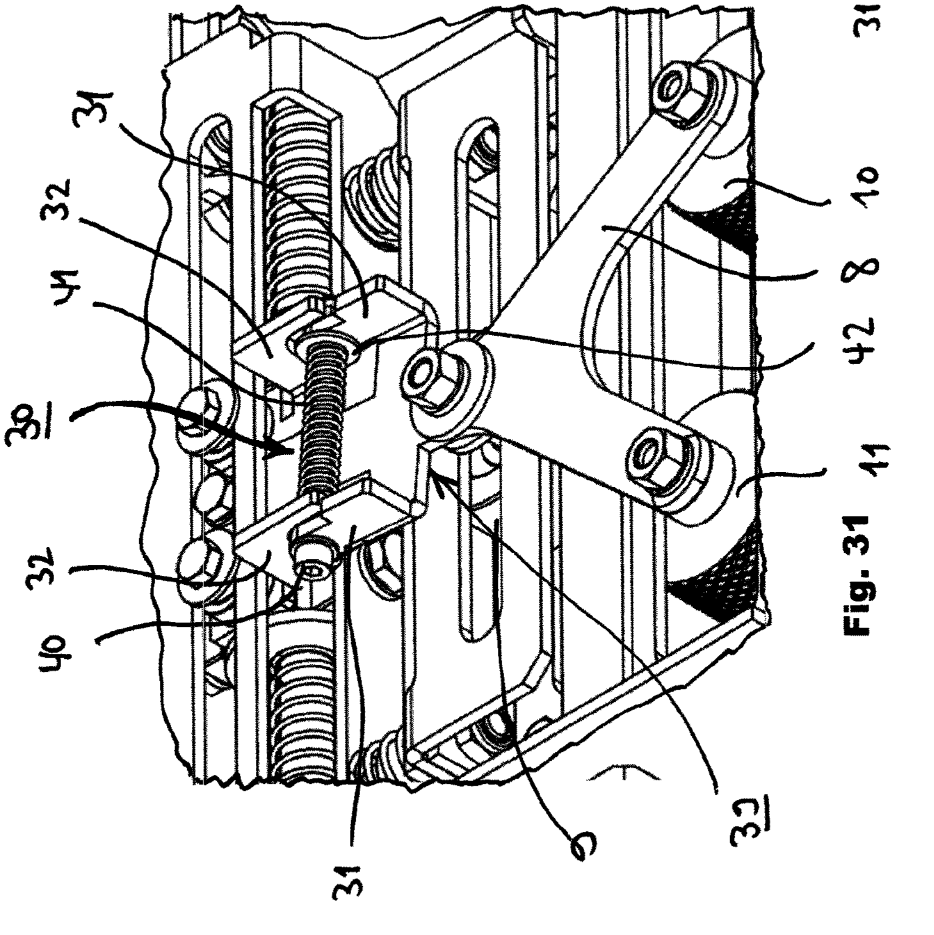

FIG. 31 Another section showing the resetting element 30.

FIG. 31*a* further detail enlargement showing the resetting element.

PREFERRED EMBODIMENTS

The operation mode of the device according to the invention is described by way of example with reference to FIGS. 1 to 29.

In this context, an embodiment example is first shown with which it is possible to trigger the elevator braking device both during a downward travel and during an upward travel.

In another embodiment, an elevator braking device is shown that is equipped with adjustable stops.

In a third embodiment, a triggering unit is shown that allows the elevator braking device to be triggered only when the car is moving downward.

First Embodiment Example

In FIG. 1, the triggering unit 1 according to the invention is shown together with an elevator braking device 23 and a section of the guide rail 21. As can be seen, the two are completely separated from each other. The triggering base body 2 of the triggering unit 1 is connected to the elevator braking device 23 via the coupling link 22. This is mostly the only physical and preferably also the only functional connection between the elevator braking device 23 and the triggering unit 1.

In the state of the triggering unit 1 shown in FIG. 1, it is in its untriggered position. This means that the first contact element 9 is prevented from making contact with the guide rail 21. The second and third contact elements 10 and 11 are then also not in contact with the guide rail 21.

Based on the sectional view of the triggering unit 1 shown in FIG. 2, the trigger mechanism of the triggering base body 2 can be described quite clearly:

The trigger 20, which is designed here as an electromagnetic lifting/holding magnet, is energized when the triggering unit 1 is not triggered. It thereby presses its plunger 29 against the trigger lever 16. The trigger lever 16 is mounted rotatably about its axis of rotation 36, which is designed as a pin. As can be seen, the trigger lever 16 is preferably designed as an offset rocker, with two rocker arms arranged at different heights and extending substantially horizontally parallel to one another, and an inclined or vertical connecting piece. Ideally, an actuating lug 27 and 28 extending in a substantially horizontal plane projects from each rocker arm. Thus or similarly configured, the trigger 20 can be accommodated laterally adjacent the slotted link 4 and the transversal slide guide to save space.

The compressive force of the plunger 29 against the lower actuating lug 28 of the trigger lever 16 holds the trigger lever 16 in its untriggered position shown in FIG. 2.

The upper actuating lug 27 of the trigger lever 16 is connected to the slotted link 4 of the triggering base body via a tension bolt 37. As long as the trigger lever 16 is pressed into its untriggered position by the plunger 29, the trigger lever 16 holds the slotted link 4 in its untriggered position away from the rail via the tension bolt 37. In doing so, the trigger lever 16 counteracts the spring force of the two spring elements, which are preferably designed as helical compression springs 5. The spring elements exert a force on the slotted link 4 in the direction of the guide rail 21. The two spring elements are preferably threaded onto guide pins or one guide pin each, which guide the slotted link 4 transversely in the direction of the guide rail.

As can also be seen in FIG. 2, neither the contact element 10 nor the contact element 11 is in engagement with the guide rail 21 during this state of the triggering unit 1.

FIG. 4 shows the rear view of the section plane from FIG. 2. This perspective is referred to below as the rear sectional view, while the perspective shown in FIG. 2 is referred to as the front sectional view.

The structure of the contact device 7 can be clearly seen here. The contact device here comprises a swivel lever 8 and several spaced-apart contact elements, here in the form of contact elements 9, 10, 11.

In the present, preferred case, the swivel lever has a Y-shaped form with a shaft and two arms extending away from it in different directions. A free end of the swivel lever or its shaft is pivotably anchored to the transversal slide 12, preferably by means of a swivel pin 18.

As can be seen clearly from FIG. 4, when the triggering unit 1 is installed as intended, the swivel lever 8 carries a first contact element 9 in the region between its anchorage and the guide rail 21. It forms a first contact region for contacting the guide rail 21. Thereby, the first contact element 9 is spaced apart from the guide rail 21 prior to the trigger. Preferably, the first contact element is a roller mounted on the swivel lever 8 so as to rotate freely.

It can be seen clearly from FIG. 4 that the swivel lever 8 projects laterally past the rail 21 to the other side of the rail facing away from the anchoring point of the swivel lever. There it carries at least one further second contact element 10, preferably at the end of one of its two ideally Y-shaped arms. This forms a second contact area for contacting the guide rail 21.

If the triggering unit is capable of bidirectional response, as shown in FIG. 4, then the swivel lever also carries a third contact element 11, which is preferably arranged at the end of the other of its two ideally Y-shaped arms.

It is worth noting that the first and second and also the third contact elements (where present, as here) are opposite each other with a height offset from the horizontal when the triggering unit is installed as intended. The second contact element is positioned on the swivel lever in such a way that it lies above the first contact element when viewed in the direction along the guide rail. The third contact element is positioned on the swivel lever in such a way that it lies below the first contact element when viewed in the same direction.

Even though the second and third contact element preferably have a roller-like shape, they are ideally not freely rotatable but rigidly fixed to the swivel lever, i.e. they can neither rotate nor move in an oblong hole.

It is particularly advantageous if the contact elements 10 and 11 nevertheless have a cylindrical, roller-like shape and can be twisted after loosening their retaining screw so that they can then be fixed again in the twisted position. In this way, any wear on the surface of the contact elements 10, 11 can be easily and quickly compensated.

It can also be seen clearly from FIG. 4 that the swivel lever 8 preferably has an oblong hole 15 whose longitudinal axis extends essentially orthogonally to the direction of travel of the car. If the swivel lever is Y-shaped, as is the case here, the oblong hole is preferably arranged in the region of the transition from the shaft of the Y to its diverging arms. The oblong hole is penetrated by the pivot axis or bearing axle pin 38, which normally holds the contact element 9 rotatably on the swivel lever.

Furthermore, it can be seen from FIG. 4 that the positioning axle pin 38 also extends through at least one oblong hole 6 in the slotted link 4, which normally extends with its longitudinal axis parallel to the direction of travel of the car.

On the basis of FIG. 4 with the rear sectional view of the triggering unit 1 in the untriggered state, it can be seen that the resetting element 30, which will be explained in more detail later, is in its neutral position.

Based on this, it is now possible to illustrate how the triggering unit works in the event of triggering.

In FIG. 5, the triggering unit 1 together with the elevator braking device 23 is shown in the logical second of its trigger. The trigger 20 is activated so that the first contact element 9 has been brought into contact with the guide rail 21. However, the elevator braking device 23 or its braking element 24 is still in an untriggered state.

As can be seen from the front sectional view of the triggering unit 1 shown in FIG. 6 and from the rear sectional view of the triggering unit 1 shown in FIG. 7, the plunger 29 now no longer exerts a compressive force on the actuating lug 28 of the trigger lever 16.

In this example, the electromagnetic lifting or holding magnet 20 is therefore no longer energized. It therefore no longer presses the plunger 29 in the direction of the trigger lever 16. As a result, the compression springs 5 pressing on the slotted link 4 no longer have any force acting against them. The slotted link 4 is therefore pressed by the compression springs 5 in the direction of the guide rail 21. The first contact element 9, which projects with its axle pin 38 through the oblong hole 6 of the slotted link 4, is pushed by the link 4 in the direction of the guide rail 21 along the oblong hole 15 in the swivel lever 8. The first contact element 9 then finally rests against the guide rail 21. The second and third contact elements 10 and 11 are still not in contact with the guide rail 21.

What happens now can best be described by looking back at FIG. 3.

As soon as the first contact element 9, which is preferably designed as a roller that can rotate freely about its axle pin 38, comes to rest against the guide rail, it begins to roll between the guide rail and the housing section of the slotted link that rests against it on the rear side. If the car is currently moving downward, this results in a translational displacement of the axle pin 38 upward along the oblong hole(s) 6 in the slotted link 4.

Since the axle pin 38 is connected to the swivel lever 8 via the oblong hole 15, a rotational movement is forced on the swivel lever 8, in this example of downward travel in the counterclockwise direction—this rotational movement takes place as shown not only in FIG. 3 but also in FIG. 9. As can be seen clearly from these figures, a second contact element 10, which is located on the other side of the guide rail from the first contact element 9, comes into contact with the guide rail as a result of this pivoting movement towards its end.

Since this contact element cannot rotate freely, considerable sliding friction forces occur between it and the guide rail. It is easy to understand that these sliding friction forces are directed upwards during downward travel. This means that they reinforce the tendency of the swivel lever to swivel further in the previous direction of rotation.

This swiveling is prevented by the second contact element, which forms a stop in this respect. However, the second contact element is thereby pressed more firmly against the guide rail. In this way, a (at least a certain) self-reinforcing effect is achieved. As a result, the minimum contact pressure force required for proper functioning and the associated friction used to actuate the elevator brake are achieved even with a weak spring system. A spring system can be used whose spring forces themselves are not sufficient to ensure such a strong contact pressure that the friction forces required to actuate the elevator brake are thereby generated. The use of a weaker spring system has the decisive advantage that the holding and return forces, which usually have to be applied electromechanically, are much lower. If holding magnets are used, their power consumption in normal operation is significantly lower. In addition, smaller holding magnets are sufficient.

Preferably, the self-reinforcing effect is so high that the swivel lever 8 at least temporarily gets stuck on the guide rail or at least moves more slowly in the direction of travel than the car. The swivel lever then lags behind the triggering unit, which continues to move with the car, and also the elevator brake, which continues to move, as illustrated, for example, in FIG. 12.

Since one end of the swivel lever is anchored to the transversal slide 12, which can be moved bidirectionally here and is preferably held in its neutral position by the opposing positioning springs 13, the transversal slide 12 moves along its guidance 14, which is preferably designed as a guide rod. In doing so, it usually tensions the corresponding positioning spring 13, which is usually threaded onto the guide rod. The latter is responsible for the subsequent return of the transversal slide 12. As a rule, the transversal slide has the task of ensuring that the movement is always correct in direction and free of tilt.

The transversal slide pulls on the coupling link against the current direction of travel of the car and thereby actuates the elevator brake or safety gear, as shown in FIG. 11. If necessary, the actuation can be carried out with great force because of the “self-tightening”.

If we now jump to FIG. 20 and FIG. 21, it is easy to see the measures that can be taken to ensure that the triggering unit resets itself towards the end of braking or catching, or prepares itself to be reset.

Preferably, a rigid (FIG. 12) or variably positionable and adjustable (FIG. 20, 21) stop 19 is provided for each contact element 10, 11 positioned on the side of the guide rail facing away from the anchoring point of the swivel lever.

The stop 19 is positioned in a certain way. Namely, in such a way that a contact element currently involved in the self-reinforcing effect due to its friction on the guide rail and thus in the trigger of the elevator brake comes to rest against the stop 19, while the elevator brake is still in the process of retracting, but before the actual braking element of the elevator brake (wedge, roller or similar) has been fully retracted.

Then what happens is what can be explained with reference to FIG. 20 for a trigger of the elevator braking device when the car is moving downward:

Since the contact element 10 runs against the stop 19 and the stop 19 continues to move downwards with the triggering unit 1 because the car has not yet come to a standstill, the contact element no longer remains completely or almost stationary on the guide rail, but is now carried along again by the triggering unit 1. At the same time, however, the coupling link 22 continues to move relative to the triggering unit, in the present case of FIG. 20 upwards. Its coupling with the braking element (brake roller, brake wedge or similar) of the elevator brake is responsible for this. This is because at the moment observed in FIG. 20, the braking element of the elevator brake is still in the process of retracting deeper into the elevator brake. The braking element therefore continues to move relative to the elevator brake and thus also relative to the triggering unit 1.

Due to these movement conditions, the conditions at the anchoring point of the swivel lever 8 change. The tensile force previously present at the anchoring point of the swivel lever 8, which caused the elevator brake to respond, is reversed and becomes a compressive force. This presses the anchoring point of the swivel lever in the opposite direction, i.e. upward in FIG. 20. The swivel lever straightens up again, the previously self-reinforcing contact element (here the contact element 10) disengages from the guide rail. As a result of the re-energization of the trigger 20, the slotted link 4 is retracted again by the trigger lever 16, away from the guide rail. This triggers the swivel lever 8. It can now fall back into its standby position or be retracted—see below—which it held before the triggering unit 1 was activated or before its self-reinforcing effect occurred.

Meanwhile, the car comes to a standstill.

To end the catch and put the elevator back into operation, the car only has to be moved a little way in the opposite direction again so that the braking element (brake roller, brake wedge or similar) comes free again. Elevator operation can then be continued without further ado.

Of course, adjustable stops are not necessarily required to achieve the self-resetting effect just described. The same effect can be achieved in the design shown in FIG. 12, for example, by dimensioning the cut-out 3 of the triggering base body so that its outer (here: upper) end forms a stop for the contact element, here for the contact element 10.

In this context, the optional, particularly advantageous resetting element 30 is now of interest, which is shown in FIGS. 4, 7, 10, 16, 19. The central aspect here is that a multi-part or preferably single-part spring element is provided. This is arranged and mounted in such a way that it moves translationally when the swivel lever moves translationally. It thus accompanies the swivel lever even when it moves in the course of its actuation of the transversal slide. The spring element tends to push the swivel lever 8 back from its swiveled position to its neutral or center position.

Particularly preferably, the resetting element 30 is designed as shown in FIG. 30*ff*. The swivel lever 8 has a spring retainer 39. The spring support 39 is preferably an integral part of the swivel lever 8. It can then be formed by two mostly L-shaped retaining arms 31, preferably formed as folded sheet metal tabs. Preferably, the retaining arms each have an approximately semicircular end on their side facing the anchoring of the swivel lever. In any case, this end has in each case an eye for a spring guide pin 40. As can be seen, a recuperating spring 41, ideally designed as a helical spring, is preferably threaded onto the spring guide pin 40. A thrust piece 42 is threaded onto each end of the recuperating spring or spring element 41, preferably in the form of a thrust washer. It is easy to see that the spring guide pin is fixed between the retaining arms 31 by its head on the one hand and its nut on the other (or alternatively by two nuts). It carries the spring element 41 and the thrust washers 42 threaded centrally between the retaining arms 31.

The transversal slide 12 in turn carries two retaining arms 32. Preferably, these are designed as an integral part of the transversal slide 12, ideally as sheet metal tabs each bent at 90°. As can be seen, each of the retaining arms 32 has a fork-shaped recess 43. The end of a retaining arm 31 associated with the swivel lever projects into each fork-shaped recess 43 with its eye for the spring guide pin 40 when the swivel lever is in the undeflected state. In this way, when the swivel lever 8 is undeployed, each of the thrust pieces 42 rests on its outer side against both a retaining arm 31 and a retaining arm 32. From the inside, the spring element 41 presses on each of the thrust pieces 42. In this way, the swivel lever is held in an elastically yielding manner in its neutral or center position, in which its second and possibly also third contact elements 10, 11 do not come into contact with the guide rail.

It can be seen quite clearly from the figures what happens when the swivel lever is swiveled, for example by the rolling of the contact element, which is designed as a freely rotatable roller, between the guide rail and the rear wall of the slotted link 4 as already described above.

On one side, the retaining arm 31 swivels away from the spring element out of the fork-shaped recess 43 assigned to it. The thrust piece 42 on this side now only finds support at the edge of the fork-shaped recess, i.e. the spring element only presses against the retaining arm 32 of the transversal slide 12 on this side.

On the other side, the retaining arm 31 swivels towards the spring element 41. It thereby compresses the spring element 41 and lifts the thrust piece 42 on this side off the retaining arm 32 of the transversal slide 12. As a result of the said compression, the spring element 41 tends to push the swivel lever 8 back to its neutral or center position via its trailing retaining arm 32.

It is noteworthy that each thrust piece 42 has a central opening or bore which is sufficiently oversized relative to the spring guide bolt 40 that the thrust piece 42 can be transversely positioned on the spring guide bolt in the course of the pivoting movement to such an extent that it can still lie flat against a holding arm of the transversal slide. Ideally, a skew angle of at least 20° relative to the normal to the longitudinal axis of the spring guide pin 40 can be realized.

In contrast to FIG. 1 to FIG. 13 discussed so far, which illustrated the triggering when the car moves downward, FIGS. 14 to 19 explain what happens when the car moves upward. What has already been said applies here correspondingly.

FIG. 29 shows one way in which such a triggering unit 1 together with an elevator braking device 23 can be mounted in the side beams 26 of a car.

FIG. 22 and FIG. 23 show a possible embodiment of the first contact element 9. In this embodiment, the contact element 9 is equipped with two O-rings around each of its running surfaces. The running surface located between the O-rings 35 has a knurling 34. This serves as emergency running in case the O-rings fail.

In the embodiment described here, the contact elements 10 and 11 are knurled and hardened rollers that are firmly screwed to the swivel lever.

Second Embodiment Example

In this case, the triggering unit 1 is additionally equipped with adjustable stops 19. FIG. 20 and FIG. 21 show a possible positioning of the stops 19 on the basic triggering unit. They serve to modify the triggering unit 1 in such a way that it can be used for different elevator braking devices without having to make design changes.

The stops 19 are positioned in the cut-outs 3 of the triggering base body 2 in such a way that the second and third contact elements 10 and 11 respectively rest against them before the braking element 24 of the elevator braking device has reached its end position during the braking process. This ensures that the self-locking between the first 9 and second 10 or first 9 and third 11 contact elements is cancelled and that the contact elements 10 or 11 do not drag along the guide rail during the braking process. The processes which lead to the swivelling back of the swivel lever 8 when the second and third contact elements 10 and 11 have reached a stop have already been explained above. In the above explanation, however, the second or third contact element 10 or 11 are not in contact with a stop 19, but with the triggering base body 2.

Third Embodiment Example

In a third embodiment, a triggering unit 1 is shown that is designed only for triggering an elevator braking device 23 when the elevator car is moving downward. This embodiment example is shown in FIG. 26, FIG. 27 and FIG. 28.

In contrast to a triggering unit 1 that can initiate the braking process both during a downward travel and during an upward travel, only two contact elements 9 and 10 are provided in the triggering unit 1 here.

The processes that lead to the self-locking between the first and second contact elements 9 and 10 in the triggering unit 1 take place in the same way as in the case of a downward travel of the first described embodiment.

The upward movement of the contact device 7 relative to the triggering base body 2 and the associated upward movement of the transversal slide 12 and the coupling link 22 connected to the transversal slide 12 and the braking element 24 located at the lower end of the coupling link 22 also take place in the same manner.

Only the springs 13 for positioning the transversal slide 12 in a neutral position are dispensable here. Since the braking element 24 can only be moved upwards by the coupling link 22 of such a triggering unit 1, there is no risk of accidental triggering of the elevator braking device if the coupling link 22 is unintentionally moved downwards.

The invention claimed is:

1. A triggering unit for actuating an elevator braking device, comprising:

a triggering base body which can be mounted on an elevator car, a trigger, a contact device, and a coupling link via which the triggering unit can be connected to an elevator braking device, wherein the triggering unit is designed as an assembly which is completely separate from the elevator braking device and, in an intended mounted state, the triggering unit is connected to the elevator braking device exclusively via the coupling link, wherein the contact device comprises a swivel lever and at least two contact elements, the swivel lever being pivotably anchored on one side of a guide rail, and the swivel lever, when the triggering unit is installed as intended, bearing a first contact element in a region between its anchoring and the guide rail, which first contact element forms a first contact region for contacting the guide rail, wherein the first contact element is spaced from the guide rail before being triggered and, when triggered, makes contact with the guide rail and the swivel lever projects past the rail as far as the other side of the rail and there carries at least one further, second contact element which forms a second contact region for making contact with the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body in such a way that, in the course of its pulling itself automatically against the guide rail, the swivel lever executes a movement which generates tension or pressure at the coupling link, so that the coupling link actuates the elevator braking device, wherein the first contact element is mounted in a slotted link which can be moved towards and away from the guide rail and which is designed and can be actuated in such a way that the slotted link holds the first contact element in a standby position on the swivel lever until triggering, in which position the first contact element is at a distance from the guide rail and, in the course of triggering, is displaced relative to the swivel lever in such a way that the first contact element is pressed against the guide rail.

2. The triggering unit according to claim 1, wherein the swivel lever comprises a third contact element on said other side of the guide rail, the second and third contact elements being arranged on the swivel lever relative to the first contact element in such a way that the swivel lever tightens in the case of triggering during upward travel by the interaction of the first and second contact elements with the guide rail and tightens in the case of triggering during downward travel by the interaction of the first and third contact elements with the guide rail, or vice versa.

3. The triggering unit according to claim 1, wherein the at least two contact elements are arranged on one and the other side of the guide rail on the swivel lever in such a way that their contact areas interacting in pairs are not completely opposite each other in a direction orthogonal to a direction of travel of the car, but are arranged offset from each other.

4. The triggering unit according to claim 1, wherein the first contact element is a freely rotatable body of rotation.

5. The triggering unit according to claim 1, wherein the swivel lever has a guidance in the form of an oblong hole, on which the first contact element is mounted in such a way that the first contact element can be displaced relative to the swivel lever in a direction of the guide rail during triggering.

6. The triggering unit according to claim 1, wherein the slotted link has a running surface arranged substantially parallel to the guide rail, which running surface is arranged and designed in such a way that the first contact element, when it has come into contact with the guide rail, rolls between the guide rail and the running surface, moves translationally and thus swivels the swivel lever.

7. The triggering unit according to claim 1, wherein the first contact element is a roller and the slotted link comprises at least one oblong hole guiding an axle portion of the roller, wherein a longitudinal axis of the oblong hole is substantially parallel to the guide rail and wherein the oblong hole is at least 10 times longer than wide.

8. The triggering unit according to claim 1, wherein the slotted link of the triggering base body is held at a distance from the guide rail by the trigger against the action of at least one spring via a trigger lever, the trigger lever being designed in the manner of a two-armed rocker with a rocker bearing located between opposite rocker arms and having a cranking which makes its ends capable of acting in different planes.

9. The triggering unit according to claim 8, wherein the end of the trigger lever facing the slotted link has an actuating lug, one large surface of which faces the guide rail completely and the other large surface of which faces away from the guide rail completely, wherein the actuating lug has an oblong hole or oversize hole in which a tension bolt is anchored with play, via which the trigger lever can pull the slotted link into its standby position away from the rail.

10. The triggering unit according to claim 9, wherein the end of the trigger lever facing away from the slotted link guidance has a further actuating lug, one large surface of which faces the guide rail completely and bears against a plunger of the trigger.

11. The triggering unit according to claim 1, wherein at least one of the contact elements is made of steel and has a running surface which has a knurling.

12. The triggering unit according to claim 1, wherein the coupling link is pivotally connectable to the elevator braking device and to a braking element thereof.

13. An elevator braking system comprising an elevator braking device and a triggering unit which, when required, triggers the elevator braking device via a coupling link, wherein the triggering unit is designed according to claim 1.

14. An elevator comprising a car and the elevator braking system according to claim 13, wherein the triggering unit is installed in a car frame of an elevator in an assembled state of the elevator braking system.

15. A triggering unit for actuating an elevator braking device, comprising:

- a triggering base body which can be mounted on an elevator car,
- a trigger,
- a contact device, and
- a coupling link via which the triggering unit can be connected to an elevator braking device, wherein the triggering unit is designed as an assembly which is completely separate from the elevator braking device and, in an intended mounted state, the triggering unit is connected to the elevator braking device exclusively via the coupling link, wherein the contact device comprises a swivel lever and at least two contact elements, the swivel lever being pivotably anchored on one side of a guide rail, and the swivel lever, when the triggering unit is installed as intended, bearing a first contact element in a region between its anchoring and the guide rail, which first contact element forms a first contact region for contacting the guide rail, wherein the first contact element is spaced from the guide rail before being triggered and, when triggered, makes contact with the guide rail and the swivel lever projects past the rail as far as the other side of the rail and there carries at least one further, second contact element which forms a second contact region for making contact with the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body in such a way that, in the course of its pulling itself automatically against the guide rail, the swivel lever executes a movement which generates tension or pressure at the coupling link, so that the coupling link actuates the elevator braking device, wherein the swivel lever is connected to the coupling link at or in an immediate vicinity of its pivotally anchored end via a common swivel pin.

16. A triggering unit for actuating an elevator braking device, comprising:

- a triggering base body which can be mounted on an elevator car,
- a trigger,
- a contact device, and
- a coupling link via which the triggering unit can be connected to an elevator braking device, wherein the triggering unit is designed as an assembly which is completely separate from the elevator braking device and, in an intended mounted state, the triggering unit is connected to the elevator braking device exclusively via the coupling link, wherein the contact device comprises a swivel lever and at least two contact elements, the swivel lever being pivotably anchored on one side of a guide rail, and the swivel lever, when the triggering unit is installed as intended, bearing a first contact element in a region between its anchoring and the guide rail, which first contact element forms a first contact region for contacting the guide rail, wherein the first contact element is spaced from the guide rail before being triggered and, when triggered, makes contact with the guide rail and the swivel lever projects past the rail as far as the other side of the rail and there carries at least one further, second contact element which forms a second contact region for making contact with the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body in such a way that, in the course of its pulling itself automatically against the guide rail, the swivel lever executes a movement which generates tension or pressure at the coupling link, so that the coupling link actuates the elevator braking device, wherein the triggering unit comprises a transversal slide which can be moved against the action of at least one spring, or against the action of two springs acting in opposite directions, and optionally against the action of pure gravity, along a guide of the triggering unit, wherein the slide carries a swivel pin to which the swivel lever is pivotably anchored with its one end and wherein also the coupling link is anchored to the slide.

17. The triggering unit according to claim 16, wherein between the swivel lever and the transversal slide there is a built in resetting element which tends to push the swivel lever back into its neutral or central position, in which the contact element or elements which the swivel lever carries on its side facing away from its anchorage to the guide rail, is or are not in contact with the guide rail, whereby the resetting element is designed in such a way that the resetting element allows the swivel lever to be swiveled clockwise and counterclockwise.

18. The triggering unit according to claim 17, wherein the resetting element comprises a single- or multi-part spring element arranged with its longitudinal axis substantially parallel to the guide rail.

19. The triggering unit according to claim 18, wherein the spring element is supported between the swivel lever and the transversal slide.

20. The triggering unit according to claim 17, wherein the spring element is mounted on the swivel lever in such a way that the spring element translates as a whole together with the swivel lever when the spring element executes a translatory movement.

21. The triggering unit according to claim 17, wherein the spring element is held on the swivel lever together with a thrust piece at its beginning and its end threaded onto a spring guide pin, wherein a fork-like left and right stop are provided on the transversal slide, so that the spring element remains suspended with its thrust piece on the left stop when the swivel lever is swiveled clockwise and is then compressed between the left stop and the swivel lever and, when the swivel lever is swiveled counterclockwise, its other thrust piece remains suspended on the right-side stop and is then compressed between the right-side stop and the swivel lever.

22. A triggering unit for actuating an elevator braking device, comprising:

a triggering base body which can be mounted on an elevator car, a trigger, a contact device, and a coupling link via which the triggering unit can be connected to an elevator braking device, wherein the triggering unit is designed as an assembly which is completely separate from the elevator braking device and, in an intended mounted state, the triggering unit is connected to the elevator braking device exclusively via the coupling link, wherein the contact device comprises a swivel lever and at least two contact elements, the swivel lever being pivotably anchored on one side of a guide rail, and the swivel lever, when the triggering unit is installed as intended, bearing a first contact element in a region between its anchoring and the guide rail, which first contact element forms a first contact region for contacting the guide rail, wherein the first contact element is spaced from the guide rail before being triggered and, when triggered, makes contact with the guide rail and the swivel lever projects past the rail as far as the other side of the rail and there carries at least one further, second contact element which forms a second contact region for making contact with the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body in such a way that, in the course of its pulling itself automatically against the guide rail, the swivel lever executes a movement which generates tension or pressure at the coupling link, so that the coupling link actuates the elevator braking device, wherein at least the contact elements have a coating of a plastic which has a Shore hardness A of 55 to 80 and consists of polyurethane.

23. A triggering unit for actuating an elevator braking device, comprising:

a triggering base body which can be mounted on an elevator car, a trigger, a contact device, and a coupling link via which the triggering unit can be connected to an elevator braking device, wherein the triggering unit is designed as an assembly which is completely separate from the elevator braking device and, in an intended mounted state, the triggering unit is connected to the elevator braking device exclusively via the coupling link, wherein the contact device comprises a swivel lever and at least two contact elements, the swivel lever being pivotably anchored on one side of a guide rail, and the swivel lever, when the triggering unit is installed as intended, bearing a first contact element in a region between its anchoring and the guide rail, which first contact element forms a first contact region for contacting the guide rail, wherein the first contact element is spaced from the guide rail before being triggered and, when triggered, makes contact with the guide rail and the swivel lever projects past the rail as far as the other side of the rail and there carries at least one further, second contact element which forms a second contact region for making contact with the guide rail, wherein the first and the second contact elements are arranged on the swivel lever in such a manner that the swivel lever automatically pulls itself against the guide rail under the influence of the forces occurring between the contact elements and the guide rail in the triggered state, and the swivel lever is anchored to the triggering base body in such a way that, in the course of its pulling itself automatically against the guide rail, the swivel lever executes a movement which generates tension or pressure at the coupling link, so that the coupling link actuates the elevator braking device, wherein an adjustable stop, which is adjustable in its position in a direction parallel to the guide rail, is provided, against which the swivel lever, with one of its contact elements, comes to rest when a relative movement between the swivel lever and the triggering base body has progressed to such an extent that the coupling link has irreversibly triggered the elevator braking device, so that a clamping or self-locking between the swivel lever and the guide rail is triggered again.

24. The triggering unit according to claim 23, wherein the stop acts on a contact element located at the end of the swivel lever facing away from the coupling link, and the stop is positioned such that a relative movement that the further tightening elevator braking device imposes on the coupling link relative to the triggering base body causes the swivel lever to be rotated in an opposite direction by the coupling link, so that its clamping with the rail is cancelled and the swivel lever is pressed back into its neutral position.

* * * * *